US009120502B2

(12) United States Patent
Mihara et al.

(10) Patent No.: US 9,120,502 B2
(45) Date of Patent: Sep. 1, 2015

(54) STEERING WHEEL POSITION ADJUSTMENT APPARATUS

(71) Applicant: NSK LTD., Tokyo (JP)

(72) Inventors: Shin Mihara, Gunma (JP); Hiroyuki Hattori, Gunma (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 14/388,389

(22) PCT Filed: Nov. 27, 2013

(86) PCT No.: PCT/JP2013/081921
§ 371 (c)(1),
(2) Date: Sep. 26, 2014

(87) PCT Pub. No.: WO2014/084262
PCT Pub. Date: Jun. 5, 2014

(65) Prior Publication Data

US 2015/0068353 A1 Mar. 12, 2015

(30) Foreign Application Priority Data

Nov. 28, 2012 (JP) ................................ 2012-259335
Nov. 28, 2012 (JP) ................................ 2012-259582

(51) Int. Cl.
*B62D 1/185* (2006.01)
*B62D 1/189* (2006.01)
(Continued)

(52) U.S. Cl.
CPC ................ *B62D 1/184* (2013.01); *B62D 1/185* (2013.01); *B62D 1/189* (2013.01); *F16H 25/186* (2013.01)

(58) Field of Classification Search
CPC ........ B62D 1/184; B62D 1/185; B62D 1/189; Y10T 74/2101; F16H 25/186
See application file for complete search history.

(56) References Cited

U.S. PATENT DOCUMENTS 3,238,797 A * 3/1966 Coughren ......................... 74/55
5,377,555 A * 1/1995 Hancock ......................... 74/493

(Continued)

FOREIGN PATENT DOCUMENTS

EP 2 505 457 A2 10/2012
JP 2002-087286 A 3/2002

(Continued)

OTHER PUBLICATIONS

International Search Report and Written Opinion dated Jan. 21, 2014, from the corresponding PCT/JP2013/081921.

(Continued)

*Primary Examiner* — Drew Brown
(74) *Attorney, Agent, or Firm* — Katten Muchin Rosenman LLP

(57) ABSTRACT

Construction is achieved that, when performing operation in order to maintain the position of a steering wheel after adjustment, is capable of reducing the operation torque that is applied to an adjustment lever 14 during the first half of the operation, and is capable of improving operability. Portions (virtual sliding-contact section lines M) of the drive-side cam surfaces 20*a* that can come in sliding contact with the driven-side continuous surfaces 24*a* when moving from a state in which the position of the steering wheel can be adjusted to a state in which the adjusted position can be maintained, are inclined toward one side in the circumferential direction at the time when the virtual sliding-contact section lines M overlap one end $N_1$ in the circumferential direction of the driven-side continuous surfaces 24*a*. As a result, during operation, the areas of sliding contact between the drive-side cam surface 20*a* and the driven-side continuous surfaces 24*a* gradually increase from the inside end in the radial direction to the outside in the radial direction.

5 Claims, 14 Drawing Sheets

(51) Int. Cl.
*B62D 1/184* (2006.01)
*F16H 25/18* (2006.01)

(56) References Cited

U.S. PATENT DOCUMENTS

| | | | | |
|---|---|---|---|---|
| 5,570,610 | A | 11/1996 | Cymbal | |
| 6,851,331 | B2 * | 2/2005 | Kuroumaru et al. | 74/493 |
| 7,717,011 | B2 * | 5/2010 | Hirooka | 74/493 |
| 8,590,932 | B2 * | 11/2013 | Dietz et al. | 280/775 |
| 8,869,647 | B2 * | 10/2014 | Hirooka et al. | 74/493 |
| 2002/0023515 | A1 * | 2/2002 | Kuroumaru et al. | 74/493 |
| 2004/0134302 | A1 * | 7/2004 | Ko et al. | 74/493 |
| 2011/0064538 | A1 | 3/2011 | Oertle | |
| 2013/0247708 | A1 | 9/2013 | Hirooka et al. | |

FOREIGN PATENT DOCUMENTS

| | | | |
|---|---|---|---|
| JP | 2003-154944 | A | 5/2003 |
| JP | 2008-307959 | A | 12/2008 |
| JP | 2009-227181 | A | 10/2009 |
| JP | 3157277 | U | 1/2010 |
| JP | 2010-126088 | A | 6/2010 |
| JP | 2010-254159 | A | 11/2010 |
| JP | 2011-121443 | A | 6/2011 |
| JP | 2012-201274 | A | 10/2012 |
| JP | 2012-211606 | A | 11/2012 |
| JP | 2014-159279 | A | 9/2014 |
| JP | 2014-159280 | A | 9/2014 |

OTHER PUBLICATIONS

Japanese Office Action dated Apr. 7, 2015 for the Corresponding Japanese Patent Application No. 2014-112710.

Japanese Office Action dated Apr. 7, 2015 for the Corresponding Japanese Patent Application No. 2014-112711.

Japanese Office Action dated Apr. 7, 2015 for the Corresponding Japanese Patent Application No. 2014-112818.

* cited by examiner

STEERING WHEEL POSITION ADJUSTMENT APPARATUS

TECHNICAL FIELD

The present invention relates to a steering wheel position adjustment apparatus for making it possible to adjust the up-down position or forward-backward position of an automobile steering wheel. Specifically, the present invention relates to the construction of a cam apparatus that is provided in the steering wheel position adjustment apparatus, and that is used for maintaining or releasing the position of the steering wheel.

BACKGROUND ART

As an apparatus for adjusting the height position of a steering wheel according to the size and driving posture of a driver, there is a tilt steering apparatus such as disclosed in JP 2009-227181 (A), JP 2010-254159 (A) and JP 2011-121443 (A). FIG. 13 to FIG. 16 illustrate an example of conventional construction of a tilt steering apparatus. This tilt steering apparatus has: a steering shaft 1 that is rotated by the operation of a steering wheel (not illustrated in the figure) that is fastened to the rear-end section (right-end section in FIG. 13) of the steering shaft 1; and a steering column 2 that is supported by and fastened to the vehicle body, and supports the steering shaft 1 on the inside thereof so as to be able to rotate freely. The front-end section (left-end section in FIG. 13) of the steering column 2 is supported by a tilt shaft 4 that is supported by a front vehicle-side bracket 3 that is fastened to the vehicle body (not illustrated in the figure) so as to be able to pivot freely. On the other hand, the middle section of the steering column 2 is supported by a rear vehicle-side bracket 5 that is fastened to the vehicle body such that the height position can be adjusted. In this specification, "front and rear" refers to the front and rear in the direction of travel of the automobile.

The rear vehicle-side bracket 5 is obtained by bending a metal plate, and has: an installation-plate section 6 that is provided at the top, and a pair of support-plate sections 7 that are parallel with each other and that hang down from the installation-plate section 6. Long tilt holes 8 that extend in the up-down direction and each have an arc shape centered around the tilt shaft 4 are formed in positions in the support-plate sections 7 that are aligned with each other. Moreover, a displacement bracket 9 having a U-shaped cross-sectional shape and that is obtained by bending a metal plate is fastened by welding or the like to a portion of the middle section of the steering column 2 that is held between the support-plate sections 7. The displacement bracket 9 has a pair of supported sections 10 that are parallel with each other and that overlap with the support-plate sections 7, and through holes 11 that are concentric with each other are formed in portions of these supported sections 10 that are aligned with the long tilt holes 8. A rod member 12 is inserted through these through holes 11 and the long tilt holes 8.

An adjustment lever 14 is provided on one end section in the axial direction (left-end section in FIG. 14) of the rod member 12, and a pressure member 13 is provided on the other end section in the axial direction (right-end section in FIG. 14) of the rod member 12. These members 13, 15 form a tilt-locking mechanism that expands or contracts the space between the inside surfaces of the support-plate sections 7 based on pivoting of the adjustment lever 14. In the example in the figure, the pressure member 13 is constructed by a nut 13 that is mounted on the other end section in the axial direction of the rod member 12.

The cam apparatus 15 is constructed by a combination of a drive cam 16 and a driven cam 17. The drive cam 16 has a circular ring shape as a whole and is provided with a center hole for the rod member 12 to be inserted through. In the assembled state, a drive-side cam surface 20 is provided on the inside surface in the axial direction (right-side surface in FIG. 14) of the drive cam 16, and this drive-side cam surface 20 has plural drive-side concave surfaces 18 and plural drive-side convex surface 19 that protrude further inward in the width direction (right side in FIG. 14, and surface side in FIG. 16) than the drive-side concave surface 18, with these concave surfaces 18 and convex surface 19 being alternately arranged in the circumferential direction. The drive cam 16 is joined and fastened to the base-end section of the adjustment lever 14, and rotates reciprocatingly around the rod member 12 as the adjustment lever 14 is pivotally rotated. The drive cam 16 is provided in a state so as to be able to rotate relative to the rod member, or so as to be able to rotate in synchronization with the rod member 12.

The driven cam 17, similar to the drive cam 16, has a circular ring shape as a whole and is provided with a center hole for the rod member 12 to be inserted through. Moreover, on the outside surface (left-side surface in FIG. 14) in the width direction of the driven cam 17 in the assembled state, a driven-side cam surface 23 is provided on which plural driven-side concave surfaces 21 and plural driven-side convex surfaces 22 that protrude further outward in the width direction (left side in FIG. 14, surface side in FIG. 15) than the driven-side concave surfaces 21 are alternately arranged in the circumferential direction. One end in the circumferential direction of the driven side convex surfaces 22 (end section on the starting-point side of rotation when the drive cam 16 rotates according to the operation of the adjustment lever 14 for maintaining the height position of the steering wheel after adjustment, or in other words, the end section in the clockwise direction in FIG. 15), and the other end in the circumferential direction of the driven-side concave surfaces 21 (end section on the ending-point side of rotation when the drive cam 16 rotates according to the operation of the adjustment lever 14 for maintaining the height position of the steering wheel after adjustment, or in other words, the end section in the counter-clockwise direction in FIG. 15) are continuous in the circumferential direction by way of driven-side continuous surfaces 24. Moreover, an engaging convex section 25 is formed on the inside surface in the width direction of the driven cam 17.

The drive cam 17 fits around the rod member 12 so as to be able to rotate relative to the rod member 12 and so as to be able to displace in the axial direction relative to the rod member 12. The engaging convex section 25 of the driven cam 17 engages inside the long tilt hole 8 in one of the support-plate sections 7 (left support-plate section 7 in FIG. 14) so as to be able to displace only along the long tilt hole 8. Therefore, the driven cam 17 can be raised or lowered along the long tilt hole 8, however, the driven cam 17 cannot rotate around its own axis.

To set a state in which the height position of the steering wheel can be adjusted, the adjustment lever 14 is rotated in a specified direction (typically downward). Then, as illustrated in FIG. 14, by setting the drive-side cam surface 20 and the driven-side cam surface 23 to a state where the drive-side convex surfaces 19 face the driven-side concave surfaces 21 and the drive-side concave surfaces 18 face the driven-side convex surfaces 22, the dimension in the axial direction of the cam apparatus 15 is reduced, and the space between the driven cam 17 and the pressure member 13 is increased. As a result, the surface pressure at the areas of contact between the inside surface of the support plate sections 7 and the outside surfaces of the supported-plate sections 10 is reduced or lost. In this state, it becomes possible to adjust the up-down position of the steering wheel within the range that the rod member 12 is able to move inside the long tilt hole 8.

In order to maintain the height position of the steering wheel after adjustment, the adjustment lever 14 is pivotally rotated in the opposite direction (typically upward) after the steering wheel has been moved to the desired height position. The drive-side cam surface 20 and driven-side cam surface 23 are set in a state such that the drive-side convex surfaces 19 come in contact with the driven-side convex surfaces 22, which increases the dimension in the axial direction of the cam apparatus 15, and reduces the space between the inside surfaces of the support-plate sections 7. In this state, the surface pressure at the areas of contact between the inside surfaces of the support-plate sections 7 and the outside surfaces of the supported-plate sections 10 increases, making it possible to maintain the height position of the steering wheel after adjustment.

In this kind of tilt steering apparatus, operation for setting the state for adjusting the height position of the steering wheel, or operation for setting the state for maintaining the height position of the steering wheel after adjustment is performed manually using the adjustment lever 14. The operation torque that is applied to the adjustment lever 14 for maintaining the height position of the steering wheel after adjustment tends to be greater than the operation torque applied to the adjustment lever 14 for setting the state for adjusting the height position of the steering wheel. Moreover, the operation torque that is applied to the adjustment lever 14 for maintaining the height position of the steering wheel after adjustment tends to increases going toward the contact state between the drive-side convex surfaces 19 of the drive-side cam surface 20 and the driven-side convex surfaces 22 of the driven-side cam surface 23 (closer to the latter half of operation of the adjustment lever 14). In a tilt steering apparatus, there is a need to improve operability by reducing this operation torque.

Conventionally, the driven-side continuous surfaces 24 of the driven-side cam surface 23 of the driven cam 17 is constructed by inclined surfaces 26*a* that are provided in the portions near the driven-side concave surfaces 21 (on one side in the circumferential direction), and inclined surfaces 26*b* that are provided on the other side in the circumferential direction from the inclines surfaces 26*a*. The angle of inclination of the inclined surfaces 26*b* with respect to an imaginary plane that exists in a direction that is orthogonal to the center axis of the driven cam 17 is less than the angle of inclination of the inclined surfaces 26*a* with respect to that imaginary plane. With this construction, an increase in operation torque that is necessary in the latter half of the operation of the adjustment lever 14 is suppressed. However, in this conventional construction, when the drive-side convex surfaces 19 of the drive-side cam surface 20 displace from the state of facing the driven-side convex surfaces 21 of the driven-side cam surface 23 up the driven-side continuous surfaces 24 of the driven-side cam surface 23 to the state of being in contact with the driven-side convex surfaces 22, the moment that is expressed as the product of the friction resistance at the areas of contact (friction areas) between the drive-side cam surface 20 and the driven-side cam surface 23 and the radius of rotation of the friction areas increases. Particularly, when the drive-side convex surfaces 19 ride up the inclined surfaces 26*a*, this moment suddenly increases and the operation torque that is necessary for operating the adjustment lever 19 also suddenly increases. Moreover, as the drive-side convex surfaces 19 of the drive-side cam surface 20 move up the driven-side continuous surfaces 24, the operational feel when operating the adjustment lever 14 may change at the boundaries with the inclined surfaces 26*a* and inclined surfaces 26*b*. As a result, the operator that is operating the adjustment lever 14 may feel that something is wrong.

RELATED LITERATURE

Patent Literature

[Patent Literature 1] JP 2009-227181 (A)
[Patent Literature 2] JP 2010-254159 (A)
[Patent Literature 3] JP 2011-121443 (A)

SUMMARY OF INVENTION

Problem to be Solved by Invention

Taking the situation above into consideration, the object of the present invention is to achieve construction of a steering wheel position adjustment apparatus that, during operation for maintaining the position of a steering wheel after adjustment, reduces the operation torque that is applied to the adjustment lever in the first half of operation, and improves the operability of the adjustment lever.

Means for Solving Problems

The steering wheel position adjustment apparatus of the present invention has: a steering shaft, a steering column, a vehicle-side bracket, a rod member, a cam apparatus, a pressure member, and an adjustment lever.

A steering wheel is fastened to the rear-end section of the steering shaft. The steering column supports the steering shaft on the inside thereof so as to be able to rotate freely. A column-side bracket is fastened to the middle section in the axial direction of the steering column, and a column-side through hole that passes in the width direction through the column-side bracket is formed in part of the column-side bracket. When this steering wheel position adjustment apparatus has a telescopic function for adjusting the forward-backward position of the steering wheel, the column-side through hole is constructed by a long hole that extends in the forward-backward direction.

The vehicle-side bracket has an installation-plate section that is supported by and fastened to a vehicle body or a member that is fastened to the vehicle body, and a pair of support-plate sections that hang down from the installation-plate section and are located on both sides in the width direction of the column-side bracket. Vehicle-side through holes are formed in portions of the pair of support-plate sections that are aligned with each other and are aligned with the column-side through hole. When this steering wheel position adjustment apparatus has a tilt function for adjusting the height position of the steering wheel, the vehicle-side through holes are constructed by long holes that extend in the up-down direction.

The rod member is inserted in the width direction through the vehicle-side through holes and the column-side through hole. The cam apparatus has a drive cam and a driven cam. The drive cam fits around one end section of the rod member in a state such that the displacement in a direction going away from one of the pair of support-plate sections is prevented, and has a drive-side cam surface on the inside in the width direction thereof. The drive cam fits around the rod member in a state such that relative rotation with respect to the rod member is possible, or such that rotation in synchronization with the rod member is possible. On the other hand, the driven cam fits around a portion near the one end of the middle section of the rod member that protrudes out from the outside surface in the width direction of the one support-plate section so as to be able to displace in the axial direction with respect to the rod member, and has a driven-side cam surface on the outside surface in the width direction thereof that engages with the drive-side cam surface. The pressure member is provided on a portion of the other end section of the rod member that protrudes out from the outside surface of the other of the pair of support-plate sections. The base-end section of the adjustment lever is joined to the drive cam.

One cam surface (first cam surface) of the driven-side cam surface and the drive-side cam surface has: plural first concave surfaces; plural first convex surfaces that are provided in portions in the circumferential direction between the first concave surfaces and that protrude further toward the side of the other cam surface (second cam surface) of the driven-side cam surface and the drive-side cam surface than the first concave surfaces; and plural first continuous surfaces that make the first concave surfaces continuous with the first convex surfaces.

On the other hand, the other cam surface (second cam surface) has: plural second concave surfaces; and plural convex surfaces that are provided in portions in the circumferential direction between the second concave surfaces and that protrude further toward the side of the one cam surface than the second concave surfaces.

Particularly, in the steering wheel position adjustment apparatus of the present invention, virtual sliding-contact section lines, that indicate portions on the other cam surface (second cam surface) that can come in sliding contact with the first continuous surfaces when moving from a state in which the position of the steering wheel can be adjusted to a state in which the position of the steering wheel can be maintained, are inclined toward the one side in the circumferential direction with respect to the one end in the circumferential direction of the first continuous surfaces at the time when the virtual sliding-contact section lines overlap the one end in the circumferential direction of the first continuous surfaces. In other words, the cam surfaces are constructed so that when the virtual sliding-contact section lines of the other cam surface (second cam surface) are not inclined with respect to the radial direction, the one end in the circumferential direction of the first continuous surfaces are inclined a specified angle toward the other side in the circumferential direction with respect to the radial direction.

In case that the one cam surface (first cam surface) is the driven-side cam surface, one circumferential direction is the starting point side of rotation when the drive cam is rotated by operating the adjustment lever for maintaining the height position of the steering wheel after adjustment. Moreover, the other circumferential direction is the opposite direction, or in other words, is the direction in which the drive cam is rotated by operating the adjustment lever for maintaining the height position of the steering wheel after adjustment, or is the ending point side of the rotation. On the other hand, in case that the one cam surface (first cam surface) is the drive-side cam surface, one direction in the circumferential direction is the direction in which the drive cam is rotated by operating the adjustment lever for maintaining the height position of the steering wheel after adjustment, or is the ending point side of the rotation, and the other circumferential direction is the opposite direction, or in other words, is the starting point side of rotation when the drive cam is rotated by operating the adjustment lever for maintaining the height position of the steering wheel after adjustment.

With this kind of construction of the present invention, when moving from a state in which it is possible to adjust the position of the steering wheel to a state in which it is possible to maintain the height of the steering wheel, the portions of sliding contact between the other cam surface (second cam surface) and the first continuous surfaces gradually increase from the inside end in the radial direction to the outside in the radial direction.

Preferably, the first continuous surfaces are each constructed by plural inclined surfaces. Moreover, the angle of inclination of the inclined surfaces with respect to a virtual plane in a direction that is orthogonal to the center axis of the cam on which the inclined surfaces are formed becomes smaller going toward the first convex surfaces.

Preferably, convex rotation stoppers are provided on the first convex surfaces, and prevent the drive cam from rotating further toward the other side in the circumferential direction with respect to the driven cam by engaging with part of the other cam surface (second cam surface).

Additionally or alternatively, the first continuous surfaces have inside continuous surfaces that are provided on the inside in the radial direction, and outside continuous surfaces that are provided on the outside in the radial direction. The inside continuous surfaces are inclined surfaces that make the edge on the other end in the circumferential direction of the first concave surfaces continuous with the edge of the one end in the circumferential direction of the first convex surfaces, and when moving from a state in which it is possible to adjust the position of the steering wheel to a state in which it is possible to maintain the position of the steering wheel, the inside continuous surfaces able to come in sliding contact with the other cam surfaces (second cam surfaces). On the other hand, the outside continuous surfaces make the portion near the first convex surfaces smoothly continuous with the edge on the one end in the circumferential direction of the first convex surfaces, and with the amount of protrusion of the outside continuous surfaces toward the side of the other cam surfaces (second cam surfaces) from the first concave surfaces less than the amount of protrusion of the inside continuous surfaces toward the side of the other cam surfaces (second cam surfaces) at the same phase positions in the circumferential direction as the inside continuous surfaces, and when moving from a state in which the position of the steering wheel can be adjusted to a state in which the position of the steering wheel can be maintained, the outside continuous surfaces do not come in sliding contact with the other cam surfaces (second cam surfaces). In this case, preferably, the phase in the circumferential direction of positions where the inclined surfaces of the outside continuous surfaces are continuous with the first convex surfaces is made to be equal to the phase in the circumferential direction of positions where the inside continuous surfaces are continuous with the first convex surfaces are the same, or is shifted toward the other side in the circumferential direction.

The steering wheel position adjustment apparatus of the present invention can be applied, as a mechanism for switching between the state for adjusting the position of the steering wheel and the state for maintaining the position of the steering wheel, in a tilt steering apparatus that is capable of adjusting the height position of the steering wheel, a telescopic steering apparatus that is capable of adjusting the forward-backward position of the steering wheel, or a tilt and telescopic steering apparatus that has both functions.

Effect of Invention

In the case of the steering wheel position adjustment apparatus of the present invention, due to operation of the adjustment lever for maintaining the position of the steering wheel after adjustment, the portions of the other cam surface that can come in sliding contact with the first continuous surfaces of the one cam surface move up the first continuous surfaces while gradually come in sliding contact from the inside end in the radial direction to the outside end in the radial direction of the first continuous surfaces and thus displace from a state in which the first concave surfaces of the one cam surface faces the second convex surfaces of the other cam surfaces (state in which the position of the steering wheel can be adjusted) to a state of contact with the first convex surfaces of the first cam surface (state in which the position of the steering wheel can be maintained after adjustment).

In other words, when moving up the first continuous surfaces, the second convex surfaces begin to ride up the first continuous surfaces more quickly, the closer to the portions on the inside end in the radial direction of the portions of the second cam surface that can come in sliding contact with the first continuous surfaces. Therefore, during the first half of the operation for maintaining the height position of the steering wheel after adjustment, the portions (friction portions) where the drive-side cam surface comes in contact or sliding contact with the driven-side cam surface can be limited to the portions near the inside end of the first continuous surfaces, and it is possible to reduce the distance (radius of rotation) of the friction portions from the center of rotation of the drive cam. As a result, the moment that is represented by the product of the friction resistance and the radius of rotation of the friction portions can be kept small, and during this operation, it is possible to reduce the operation torque that must be applied to the adjustment lever. Moreover, in the first half of this operation, as the friction portions gradually expand to the outer-diameter side, the moment gradually (in a smooth and continuous state) becomes larger. Therefore, the moment does not become large suddenly, and the operator of the adjustment lever is not given a feeling that something is wrong.

BRIEF DESCRIPTION OF DRAWINGS

FIG. 8A illustrates the adjustable state of the steering wheel position, FIG. 8B illustrates the state in which the drive-side convex surfaces of the drive-side cam surface ride up on the driven-side continuous surface of the driven-side cam surface, and FIG. 8C illustrates the state in which the adjusted position of the steering wheel can be maintained.

MODES FOR CARRYING OUT INVENTION

First Example

Figure 13:
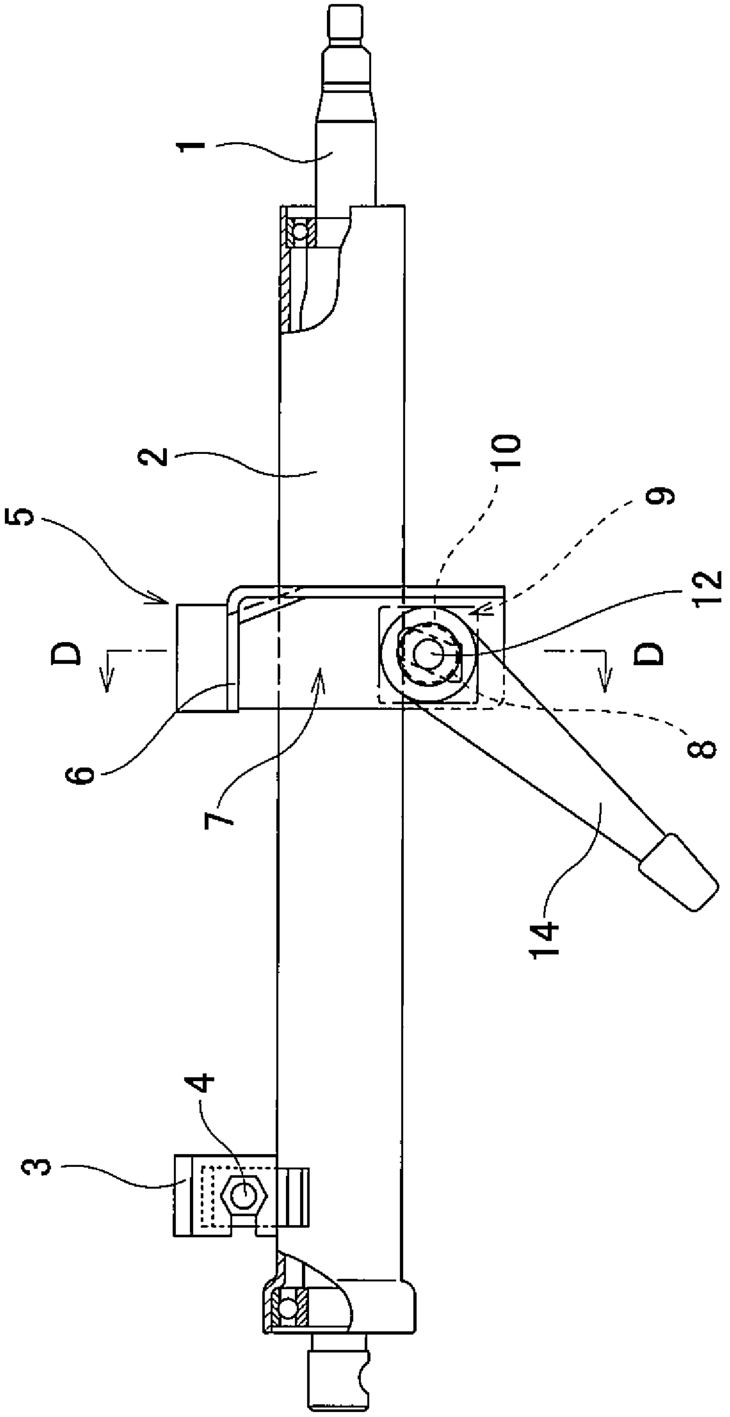
FIG. 13 is a side view illustrating an example of a conventional steering wheel position adjustment apparatus.

FIG. 1 to FIG. 8C illustrate a first example of an embodiment of the present invention. The steering wheel position adjustment apparatus of the present invention has: a steering shaft 1, a steering column 2, a vehicle-side bracket 5, a rod member 12, a cam apparatus 15, a nut 13 as a pressure member, and an adjustment lever 14 (see FIG. 13 and FIG. 14).

A steering wheel (not illustrated in the figures) is fastened to the rear-end section of the steering shaft 1. The steering column 2 supports the steering shaft 1 on the inside thereof so as to be able to rotate freely. A displacement bracket 9, which is a column-side bracket, is fastened to the middle section in the axial direction of the steering column 2. The displacement bracket 9 is obtained by bending a metal plate so as to have a U-shaped cross-sectional shape, and is fastened to the middle section in the axial direction of the steering column 2 by welding or the like. The displacement bracket 9 has a pair of supported sections 10 that are parallel with each other, and a through hole 11, as a column-side through hole, is formed in each of the supported sections 10 so as to pass in the width direction through the displacement bracket 9 and to be concentric with each other. However, it is also possible to make the displacement bracket 9 solid, and to form a column-side through hole 11 that passes in the width direction though the displacement bracket 9.

The vehicle-side bracket 5 is obtained by bending a metal plate, and has: an installation-plate section 6 that is supported by and fastened to the vehicle body or a member (not illustrated in the figures) that is fastened to the vehicle body, and a pair of support-plate sections 7 that hang downward from the installation-plate section 6 and hold the displacement bracket 9 from both sides in the width direction. Through tilt holes 8 that are constructed by long holes in the up-down direction that extend in the up-down direction are formed in the portions of the pair of support-plate sections 7 that are aligned with each other and are aligned with the column-side through holes 11.

The rod member 12 is inserted in the width direction through the vehicle-side through holes 8 and the column-side through holes 11. The cam apparatus 15 has a drive cam 16*a* and a driven cam 17*a*. The drive cam 16*a* has a circular ring shape as a whole and is provided with a center hole for the rod member 12 to be inserted through, and has a drive-side cam surface 20*a* that is located on the inside in the width direction in the assembled state, and fits around one end section of the rod member 12 in a state in which displacement in a direction going away from one support-plate section 7 is prevented. In this example, the drive cam 16*a* fits around the rod member 12 in a state such that relative rotation is possible. However, it is also possible to employ construction in which the drive cam 16*a* fits around the rod member 12 so as to be able to rotate in synchronization with the rod member 12. A drive-side cam surface 20*a* that is uneven in the circumferential direction is formed on the inside surface in the width direction of the drive cam 16*a* in the assembled state (front-side surface in FIG. 5, left-side surface in FIG. 6, right-side surface in FIG. 14). Moreover, an engaging convex section 32 is formed on the outside surface in the width direction of the drive cam 16*a* in the assembled state. On the other hand, the driven cam 17*a* has a circular ring shape as a whole and is provided with a center hole for the rod member 12 to be inserted through, and fits around a portion near the one end of the middle section of the rod member 12 that protrudes from the outside surface in the width direction of the one support-plate section 7 such that relative displacement in the axial direction with respect to the rod member 12 is possible. Moreover, a driven-side cam surface 23*a* that is uneven in the circumferential direction and that engages with the drive-side cam surface 23*a* is formed on the outside surface in the width direction of the driven cam 17*a* in the assembled state (front-side surface in FIG. 2, left-side surface in FIG. 3, left-side surface in FIG. 14). An engaging convex section 25 is formed on the inside surface in the width direction of the driven-side cam 17*a* in the assembled state. The nut 13 is provided in the portion on the other end section of the rod member 12 that protrudes from the outside surface of the other support-plate section 7. The base-end section of the adjustment lever 14 is joined to the drive cam 16*a*.

A feature of this example, is that the construction of the drive-side cam surface 20*a* of the drive cam 16*a* and the driven-side cam surface 23*a* of the driven side cam 17*a* of the cam apparatus 15 for maintaining and releasing the position of the steering wheel has been devised. The construction and functions of the other parts are the same as those of a conventional steering wheel position adjustment apparatus, so explanations of identical parts are omitted or simplified, so that the explanation below centers on the feature of this example. In the following, an example of the case of applying the steering wheel position adjustment apparatus of this example to a tilt steering apparatus that is capable of adjusting only the height position of the steering wheel will be explained.

The driven-side cam surface 23*a*, which is a first cam surface, has driven-side concave surfaces 21*a* (first concave surfaces) that are provided at plural locations in the circumferential direction (four locations in the example), driven-side convex surfaces 22*a* (first convex surfaces) that are provided at plural locations in the circumferential direction (four locations in this example, and driven-side continuous surfaces 24*a* (first continuous surfaces) that are provided in plural locations in the circumferential direction (four locations in this example). The number of driven-side concave surfaces 21*a* and driven-side convex surfaces 22*a* can be any arbitrary number as long as there is the same number of each.

The driven-side concave surfaces 21*a* are formed at four locations on the outside surface in the width direction of the driven cam 17*a* that are separated in the circumferential direction, and have fan-shaped flat surfaces, the width in the circumferential direction of which increases going outward in the radial direction. The driven-side convex surfaces 22*a* are formed in portions between the driven-side concave surfaces 21*a* that are adjacent in the circumferential direction, and protrude further outward in the width direction (toward the drive-side cam surface 20*a* of the drive cam 16*a* in the assembled state) than the driven-side concave surfaces 21*a*, and have fan-shaped flat surfaces, the width in the circumferential direction of which increases going outward in the radial direction.

In the portions between one end in the circumferential direction of the driven-side convex surfaces 22*a* (end at the starting side of rotation when the drive cam 16*a* is rotated by operation of the adjustment lever 14 for maintaining the height position of the steering wheel after adjustment) and the other end in the circumferential direction of the driven-side concave surfaces 21*a* (front end in the direction of rotation when the drive cam 16*a* is rotated by operation of the adjustment lever 14 for maintaining the height position of the steering wheel after adjustment), there are driven-side continuous surfaces 24*a* that make the driven-side convex surfaces 22*a* and the driven-side concave surfaces 21*a* continuous and that have inclined surfaces 31. The inclined surfaces 31 each have plural inclined sections (three in this example), with the end edges in the circumferential direction of the inclined sections that are adjacent in the circumferential direction smoothly continuous.

The angle of inclination of these inclined sections with respect to a virtual plane that is in a direction orthogonal to the center axis of the driven cam 17*a* becomes smaller the closer the inclined sections are to the driven-side convex surface 22*a* (toward the other side in the circumferential direction). Moreover, the amount of protrusion (height) outward in the axial direction with respect to the driven-side concave surface 21*a* at the same phase position in the circumferential direction of the inclined surface 31, or in other words, on the same line drawn in the radial direction, becomes the same. Furthermore, the one end ($N_1$) is formed so as to incline toward the other side in the circumferential direction by an angle $\theta$ with respect to the radial direction (with respect to virtual lines $\alpha_1$, $\beta_1$ that extend in the radial direction and pass through the center axis of the driven cam 17*a* (see FIG. 2)). One end in the circumferential direction of the driven-side concave surfaces 21*a* and the other end in the circumferential direction of the driven-side convex surfaces 22*a* are each continuous by way of a stepped section, however, the construction of the portion is not related to the scope of the present invention.

Convex rotation stoppers 30 that protrude further outward in the width direction than the driven-side convex surfaces 22*a* are formed on the other end sections in the circumferential direction of the driven-side convex surfaces 22*a* near the outside ends in the radial direction. The convex rotation stoppers 30 prevent the drive cam 16*a* from rotating any further toward the other side in the circumferential direction with respect to the driven-side cam 17*a* by coming in contact with drive-side continuous surfaces 29*a* that make one end in the circumferential direction of the drive-side concave surfaces 18*a* of the drive cam 16 continuous with the other end in the circumferential direction of drive-side convex surfaces 19*a* (see FIG. 8C). The other construction of the driven cam 17*a* is the same as the construction of the driven cam 17 of the conventional steering wheel position adjustment apparatus.

The drive-side cam surface 20*a*, which is a second cam surface, has drive-side concave surfaces 18*a* (second concave surfaces) that are provided at plural locations in the circumferential direction (four locations in this example), and drive-side convex surfaces 19*a* that are provided in plural locations in the circumferential direction (four locations in this example). The number of drive-side concave surfaces 18*a* and drive-side convex surfaces 19*a* is arbitrary as long as the number is the same as the number of driven-side concave surfaces 21*a* and driven-side convex surfaces 22*a*.

The drive-side concave surfaces 18*a* are formed at four locations on the inside surface in the width direction of the drive cam 16*a* that are separated in the circumferential direction, and have fan-shaped flat surfaces, the width in the circumferential direction of which increases going outward in the radial direction. Moreover, the drive-side convex surfaces 19*a* are formed in portions between the drive-side concave surfaces 18*a* that are adjacent in the circumferential direction and protrude further in the inward direction (toward the driven-side cam surfaces 23*a* of the driven cam 17*a* in the assembled state) than the drive-side concave surfaces 18*a*, and have fan-shaped flat surfaces, the width in the circumferential direction of which increases going outward in the radial direction. In other words, the drive-side concave surfaces 18*a* have a shape that can engage with the driven-side convex surfaces 22*a*, and the drive-side convex surfaces 19*a* have a shape that can engage with the driven-side concave surfaces 21*a*. One end in the circumferential direction of the drive-side concave surfaces 18*a* and the other end in the circumferential direction of the drive-side convex surfaces 19*a* are smoothly continuous by way of drive-side continuous surfaces 29*a*. On the other hand, the other end in the circumferential direction of the drive-side concave surfaces 18*a* and one end in the circumferential direction of the drive-side convex surfaces 19*a* are continuous by way of the drive-side continuous surfaces 29*b*.

Figure 7:
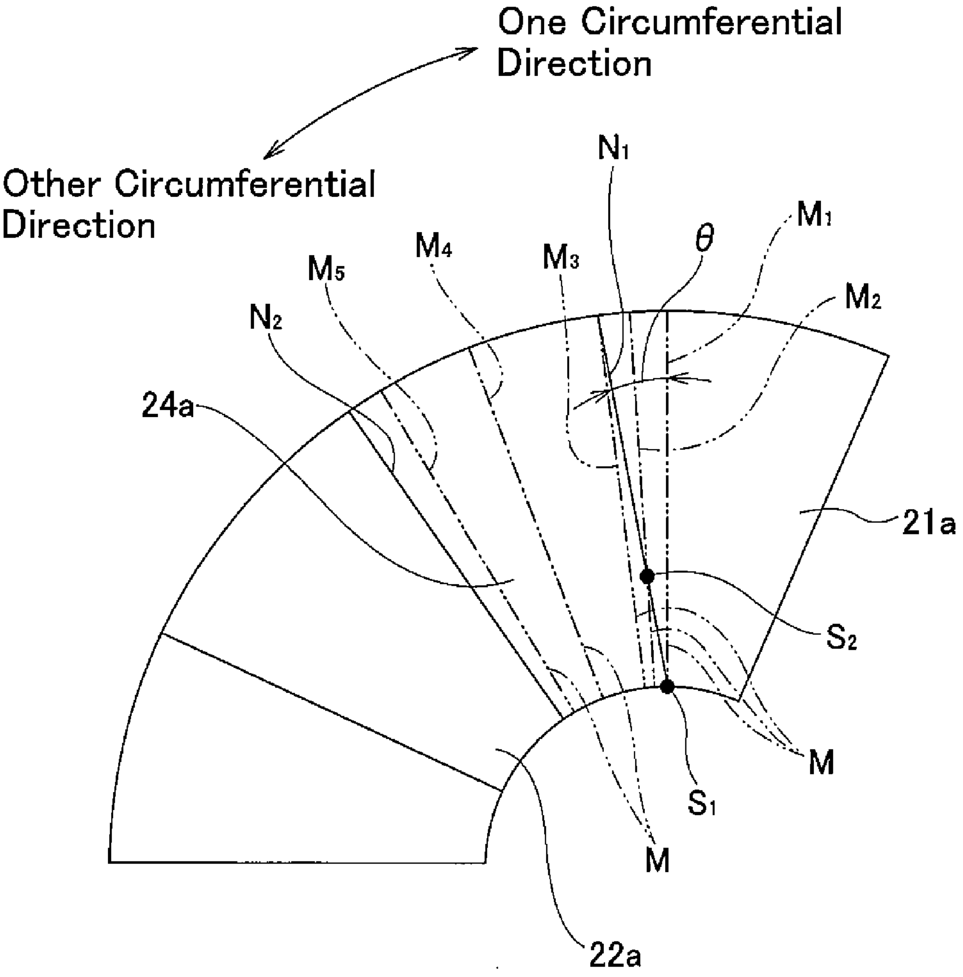
FIG. 7 is a schematic drawing for explaining the state in which the portion of the drive-side cam surface of the drive cam illustrated in FIG. 4 that can come in sliding contact with the driven-side continuous surface of the driven cam illustrated in FIG. 1 move up the driven-side continuous surface.
Figure 8:
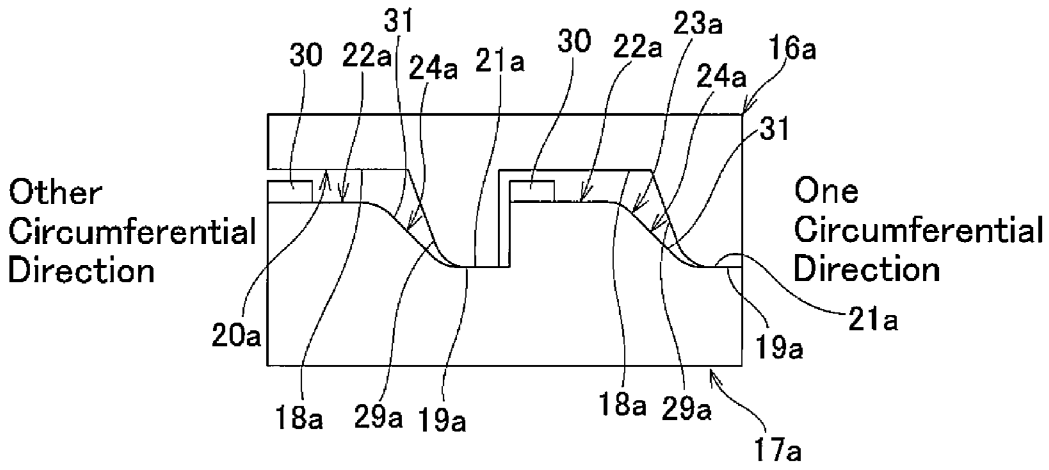
FIGS. 8A to 8C are schematic drawings for explaining the operation of the cam apparatus which is used in the steering position adjustment apparatus of the first example of an embodiment of the present invention and correspond to section A-A in FIG. 1, where
Figure 8:
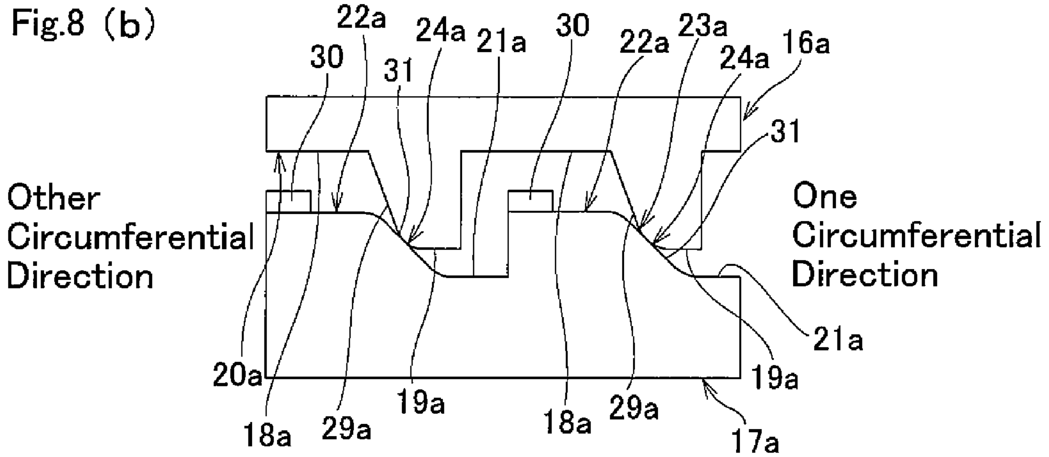
Figure 8:
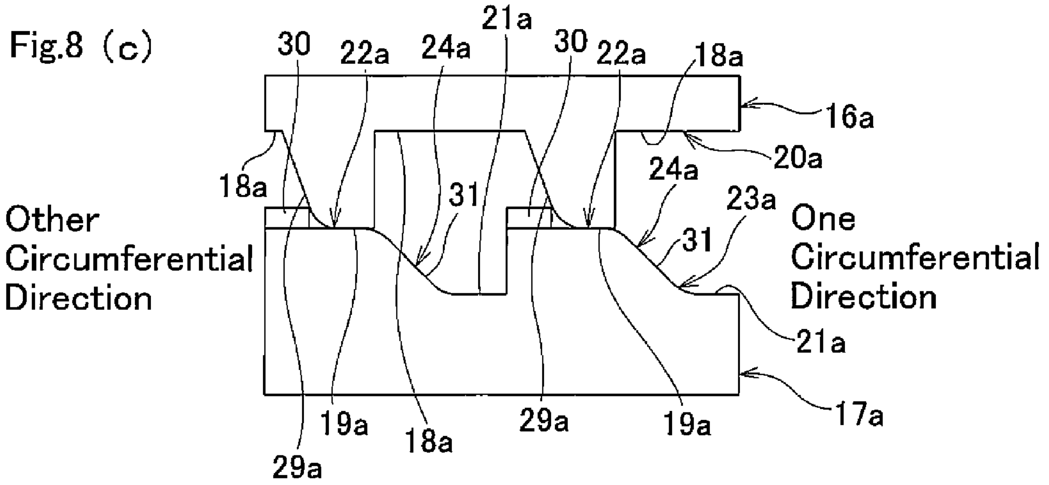

Virtual sliding-contact section lines M, that indicate portions of the drive-side cam surface 20*a* that can come in sliding contact with the driven-side continuous surfaces 24*a* (see FIG. 5 and FIG. 7) when moving from a state in which the position of the steering wheel can be adjusted to a state in which that position can be maintained, are not inclined with respect to the radial direction (with respect to virtual lines $\alpha_2$, $\beta_2$ that extend in the radial direction and pass through the center axis $O_{16a}$ of the drive cam 16*a*). In other words, as illustrated in FIG. 7, in the assembled state, the virtual sliding-contact section lines M are inclined toward one side in the circumferential direction by the angle θ with respect to the one end ($N_1$) in the circumferential direction of the driven-side continuous surfaces 24*a* when the inside ends in the radial direction of the virtual sliding-contact section lines M overlap the one end ($N_1$) in the circumferential direction of the driven-side continuous surfaces 24*a* (state in which the virtual sliding-contact section lines M are located at the position of the two-dot dash lines $M_1$ in FIG. 7).

Concave sections 37 that are further recessed outward in the width direction (rear side in FIG. 5) in the assembled state than the drive-side concave surfaces 18*a*, and that have a shape capable of engaging with the convex rotation stoppers 30 of the driven cam 17*a* are formed in the other end sections in the circumferential direction of the drive-side concave surfaces 18*a* near the outside end in the radial direction. The concave sections 37 and the convex rotation stoppers 30 engage with each other in the state in which the height position of the steering wheel can be adjusted (in the state in which the drive-side concave surfaces 18*a* face the driven-side convex surfaces 22*a*), and prevent interference between the convex rotation stoppers 30 and the drive-side concave surfaces 18*a*. The other construction of the drive cam 16*a* is the same as the construction of the drive cam 16 of the conventional steering wheel position adjustment apparatus.

Figure 14:
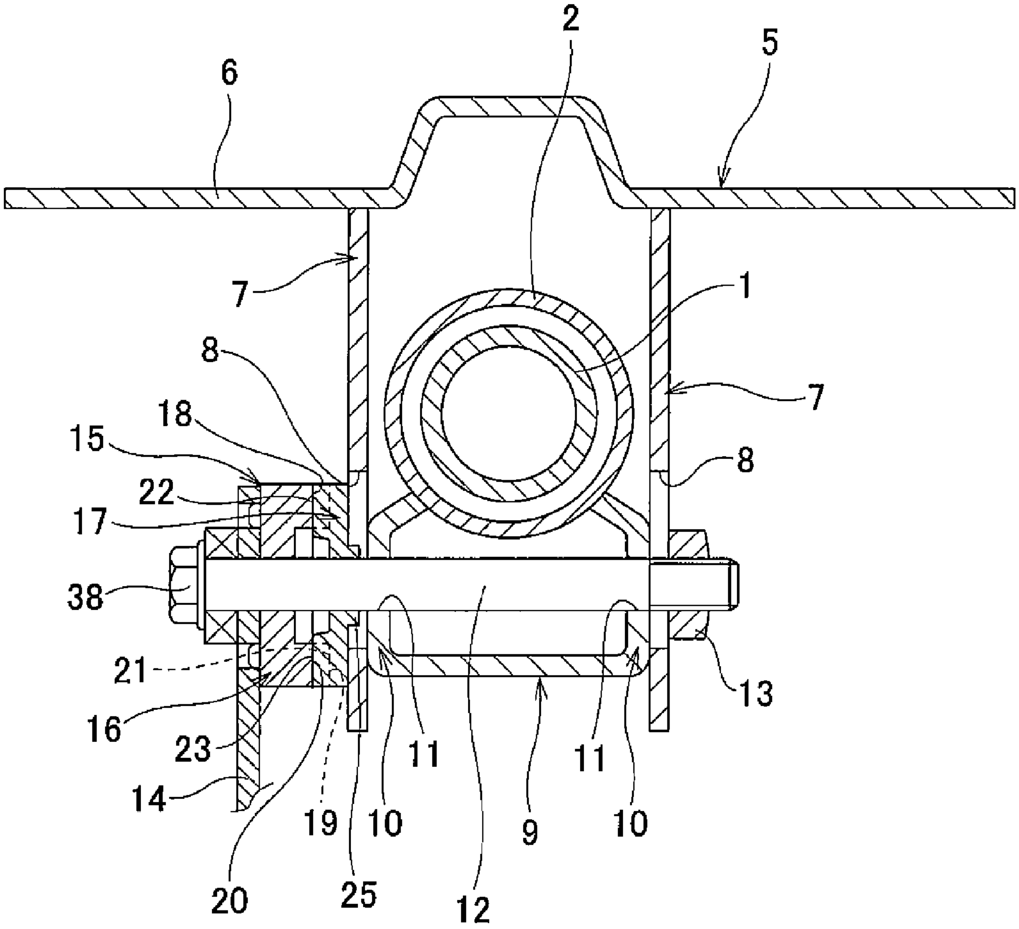
FIG. 14 is a cross-sectional drawing of section D-D in FIG. 13.
Figure 15:
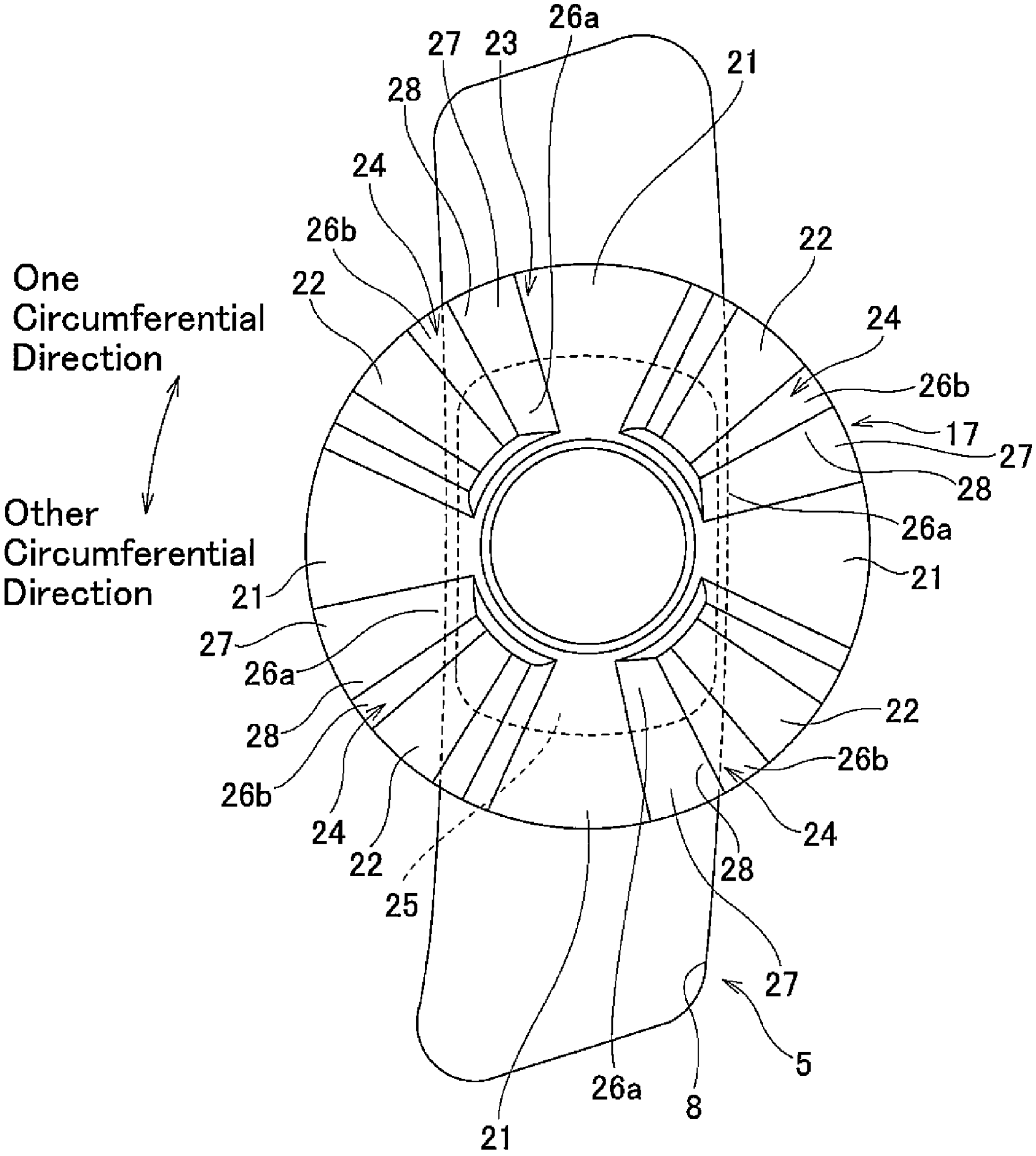
FIG. 15 is a drawing of a driven cam that is assembled in the steering wheel position adjustment apparatus illustrated in FIG. 13, and is s view of the assembled state as seen from the outside in the width direction.
Figure 16:
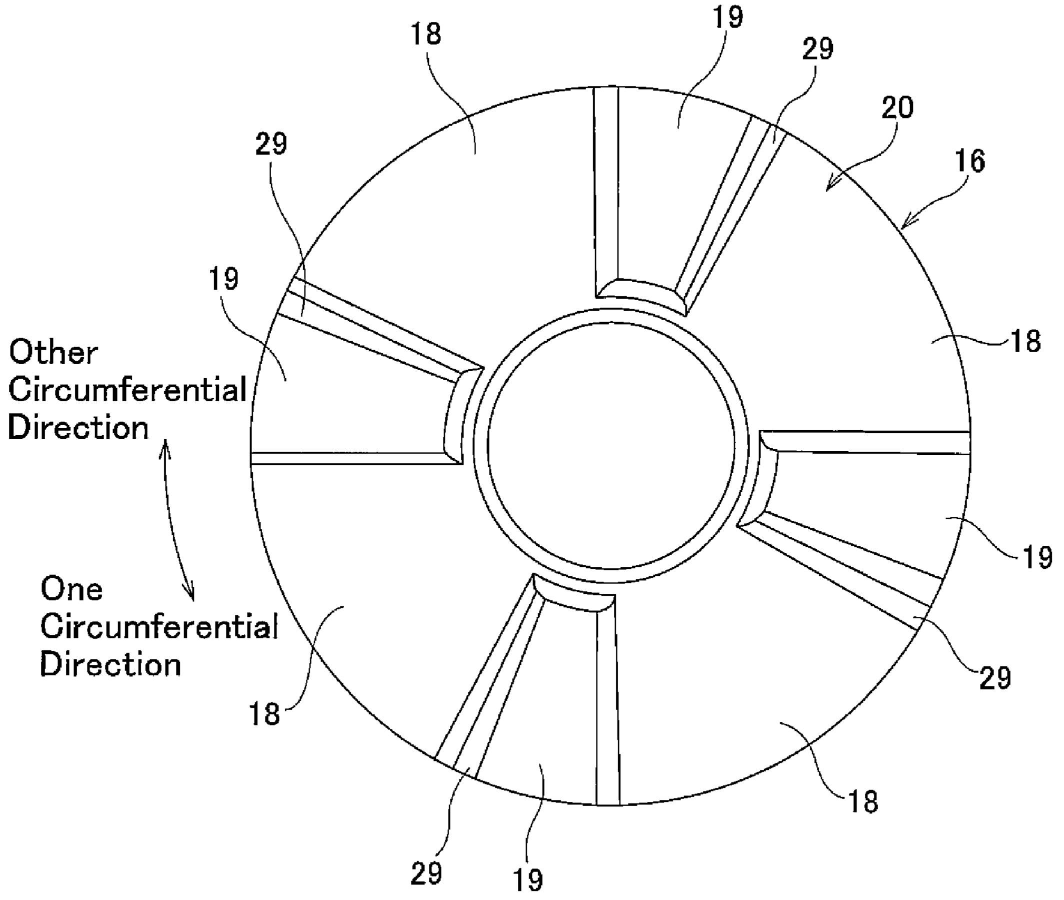
FIG. 16 is a drawing of a drive cam that is assembled in the steering wheel position adjustment apparatus illustrated in FIG. 13, and is a view of the assembled state as seen from the inside in the width direction.

The drive cam 16*a* and the driven cam 17*a* are assembled around the portion near the one end of the middle section in the axial direction of the rod member 12 (see FIG. 14) to form the cam apparatus 15 (see FIG. 14). Except for the construction of the drive-side cam surface 20*a* and the driven-side cam surface 23*a*, the construction of the cam apparatus 15 is the same as that of the conventional construction.

Next, how the virtual sliding-contact section lines M that indicate the portions of the drive-side cam surface 20*a* that can come in sliding contact with the driven-side continuous surfaces 24*a* when operating the adjustment lever 14 in order to maintain the height position of the steering wheel after adjustment displace with respect to the driven-side continuous surfaces 24*a* will be explained while referencing FIG. 7.

First, the one end ($N_1$ in FIG. 7) in the circumferential direction of the driven-side continuous surfaces 24*a* is inclined by an angle θ toward the other side in the circumferential direction. On the other hand, the virtual sliding-contact section lines M ($M_1$ to $M_5$ in FIG. 7) are not inclined with respect to the radial direction. In other words, the virtual sliding-contact section lines M, that indicate the portions of the drive-side cam surfaces (second cam surfaces) 20*a* that can come in sliding contact with the driven-side continuous surfaces (first continuous surfaces) 24 of the driven-side cam surfaces (first cam surfaces) 23*a* when moving from the state for adjusting the position of the steering wheel to the state capable of maintaining the position of the steering wheel, are inclined toward the one side in the circumferential direction with respect to the one end in the circumferential direction of the driven-side continuous surfaces 24*a* at the time when the virtual sliding-contact section lines M overlap the one end section in the circumferential direction of the driven-side continuous surfaces 24*a*. Such virtual sliding-contact section lines M exist at the position indicated by $M_1$ in FIG. 7 when riding up on the driven-side continuous surfaces 24*a*. In this state, only the inside end (point $S_1$ in FIG. 7) in the radial direction of the virtual sliding-contact section lines M ($M_1$) come in contact with the driven-side continuous surfaces 24*a*.

When the drive cam 16*a* is rotated from this state in the other direction in the circumferential direction (counterclockwise direction in FIG. 7), due to this rotation, the virtual sliding-contact section lines M move to the position indicated by $M_2$ in FIG. 7. The amount of protrusion (height) of the driven-side continuous surfaces 24*a* with respect to the driven-side concave surfaces 21*a* at the same phase position in the circumferential direction, or in other words, on the same drawn line in the radial direction is the same, so at this position, the portions of the virtual sliding-section lines M ($M_2$) from the inside end in the radial direction to the portion (point $S_2$ in FIG. 7) near the inside end of the middle section in the axial direction come in contact with the driven-side continuous surfaces 24*a*.

When the drive cam 16*a* is further rotated in the other direction in the circumferential direction, due to that rotation, the virtual sliding-contact section lines M move to $M_3 \rightarrow M_4 \rightarrow M_5$. At these positions, the virtual sliding-section lines M ($M_3$, $M_4$, $M_5$) come in contact with the driven-side continuous surfaces 24*a* along the entire length in the radial direction. The virtual sliding-contact section lines M then pass the other end (solid line $N_2$ in FIG. 7) in the circumferential direction of the driven-side continuous surfaces 24*a* and ride up the driven-side convex surfaces 22*a*.

In the case of the steering wheel position adjustment apparatus of this example, when, due to the operation of the adjustment lever for maintaining the position of the steering wheel after adjustment, the drive-side convex surfaces 19*a* of the drive-side cam surface 20*a* displace from the state of facing the driven-side concave surfaces 21*a* of the driven-side cam surface 23*a* (state in which the height position of the steering wheel can be adjusted) as illustrated in FIG. 8A to a state of riding up on the driven-side continuous surfaces 24*a* of the driven-side cam surface 23*a*, so that the portions where the drive-side cam surface 20*a* can come in sliding contact with the driven-side continuous surfaces 24*a* (virtual sliding-contact section lines M) gradually move up (comes in sliding contact) from the inside end in the radial direction to the outside end in the radial direction, and then as illustrated in FIG. 8C, displace to the state of coming in contact with the driven-side convex surfaces 22*a* of the driven-side cam surface 23*a* (state in which the position of the steering wheel after adjustment can be maintained).

In other words, when the drive-side convex surfaces 19*a* move up the driven-side continuous surfaces 24*a*, the drive-side convex surfaces 19*a* begin to ride up the driven-side continuous surfaces 24*a* as fast as the inside end portion in the radial direction of the portions (virtual sliding-contact section lines M) where the drive-side cam surfaces 20*a* can come in sliding contact with the driven-side continuous surfaces 24*a*. Therefore, in the first half of operation of the adjustment lever 14, the portions (friction portions) where the drive-side cam surface 20*a* come in contact (sliding contact) with the driven-side cam surface 23*a* are limited to the portions near the inside ends of the driven-side continuous surfaces 24*a*, and the distance (radius of rotation) of the friction portions from the center of rotation of the drive cam 16*a* can be reduced. As a result, the moment that is expressed as the product of the friction resistance and the radius of rotation of the friction portion can be kept small, and when operating the adjustment lever 14, the operation torque that is applied to the adjustment lever 14 can be reduced. Moreover, in the first half of this operation, as the friction portions gradually expand to the outer-diameter side, the moment gradually (in a smooth, continuous state) increases. Therefore, this moment does not increase suddenly, and so giving operator of the adjustment lever 14 a feeling that something is wrong can be prevented.

In this example, the inclination of the inclined surface of the driven-side continuous surfaces 24*a* that is on the side near the driven-side concave surface 21*a* (inclined surface where the portion that can come in sliding contact (virtual sliding-contact section line M) rides upward in the first half of operation) is formed in a sharp state with respect to the inclination of the inclined surface on the side near the driven-side convex surfaces 22*a*. Therefore, the distance in the circumferential direction when the portion capable of sliding contact (virtual sliding-contact section line M) rides up on the driven-side continuous surface 24*a* can be shortened (the pivotal rotation range of the adjustment lever 14 is reduced), and thus improved operability can be achieved. In this way, even when construction in which relatively sharp inclined surfaces are provided on the driven-side continuous surfaces 24*a*, it is possible to keep the moment that occurs when the portion that is capable of sliding contact (virtual sliding-contact section line M) rides up on this sharp inclined surface small. As a result, during operation, it is possible to reduce the operation torque that is applied to the adjustment lever 14, and achieve improved operability. By increasing the angle θ, the timing of contact between the virtual sliding-contact section lines M and the driven-side continuous surfaces 24*a* over the entire length in the radial direction can be delayed, for example, until the position $M_3$ or $M_4$.

In this example, in the state in which it is possible to maintain the position of the steering wheel after adjustment, the convex rotation stoppers 30 of the driven-side cam surface 23*a* and the drive-side continuous surfaces 29*a* of the drive-side cam surface 20 come in contact (engage). Therefore, further relative rotation of the drive cam 16*a* in the other direction in the circumferential direction with the respect to the driven-side cam 17*a* is prevented. As a result, the adjustment lever 14 is prevented from being rotated more than necessary and releasing the state of maintaining the adjusted position of the steering wheel.

In this example, special construction is given to only the driven-side cam surface 23*a* of the driven cam 17*a*, and for the drive-side cam surface 20*a* of the drive cam 16*a* special construction is not used, so typical cam construction can be used. Therefore, in order to obtain the same effect of the present invention, there is no need to apply special construction to both the drive cam and driven cam of the cam apparatus, so it is possible to keep down manufacturing costs of the cam apparatus.

Second Example

FIG. 9 to FIG. 11B illustrate a second example of an embodiment of the present invention. In this example, the driven-side continuous surfaces 24*b* of the driven-side cam surface 23*b* of the driven cam 17*b* are each constructed by an inside continuous surface 33 that is provided on the inside in the radial direction, and an outside continuous surface 34 that is provided on the outside in the radial direction. The inside continuous surface 33 is constructed by an inclined surface 31*a* that makes continuous a portion that extends from the inside end in the radial direction of the other end in the circumferential direction of the driven-side concave surface 21*b* (end in the counterclockwise direction in FIG. 10, and the left end in FIG. 11) to the portion near the outside end of the middle section in the radial direction (portion that is approximately ⅔ the length dimension in the radial direction from the inside end in the radial direction of the driven-side concave surface 21*b*), and a portion that extends from the inside end in the radial direction of the one end in the circumferential direction of the driven-side convex surface 22*b* to the portion near the outside end of the middle section in the radial direction. The inclined surface 31*a* has plural inclined sections (four in this example), and the inclined sections that are adjacent to each other in the circumferential direction are smoothly continuous in the circumferential direction. Moreover, the angle of inclination of the inclined sections with respect to a virtual plane that is in a direction that is orthogonal to a center axis of the driven cam 17*b* becomes less the closer the inclined section is to the driven-side convex surfaces 22*b*.

The outside continuous surface 34 smoothly makes a portion that extends from the portion near the outside end of the middle section in the radial direction of the other end in the circumferential direction of the driven-side concave surface 21*b* to the outside end in the radial direction continuous with a portion that extends from the portion near the outside end of the middle section in the radial direction of the one end in the circumferential direction of the driven-side convex surface 22*b* to the outside end in the radial direction. Moreover, the outside continuous surface 34 is such that the portion near the one end in the circumferential direction is a first inclined surface 35, and the portion near the other end in the circumferential direction is a second inclined surface 36 having an angle of inclination with respect to the virtual plane that is in a direction orthogonal to the center axis of the driven-cam 17*b* that is less than the angle of inclination with respect to the virtual plane of the first inclination surface 35.

Figure 9:
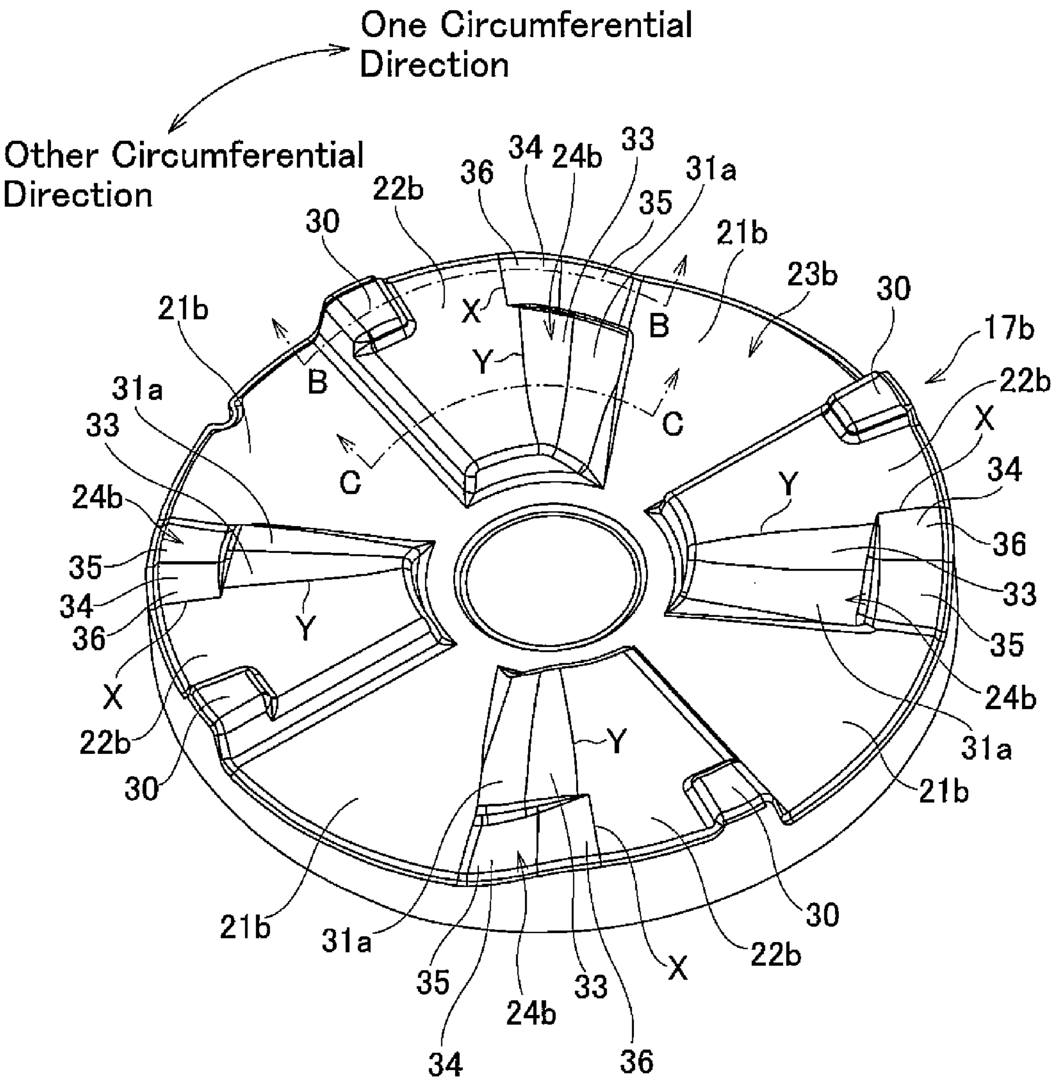
FIG. 9 is a drawing similar to FIG. 1 of a second example of an embodiment of the present invention.
Figure 10:
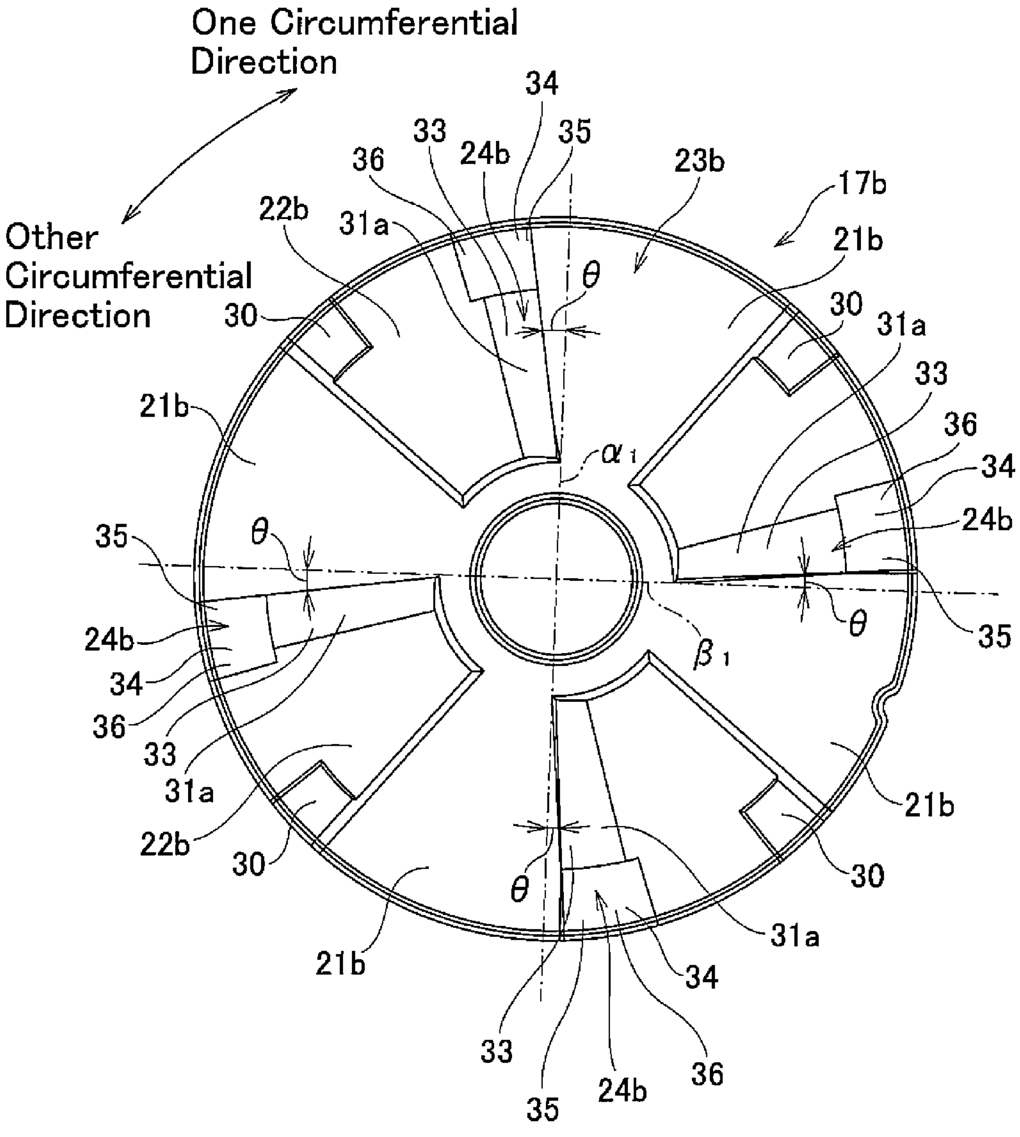
FIG. 10 is a drawing similar to FIG. 2 of a second example of an embodiment of the present invention.
Figure 11:
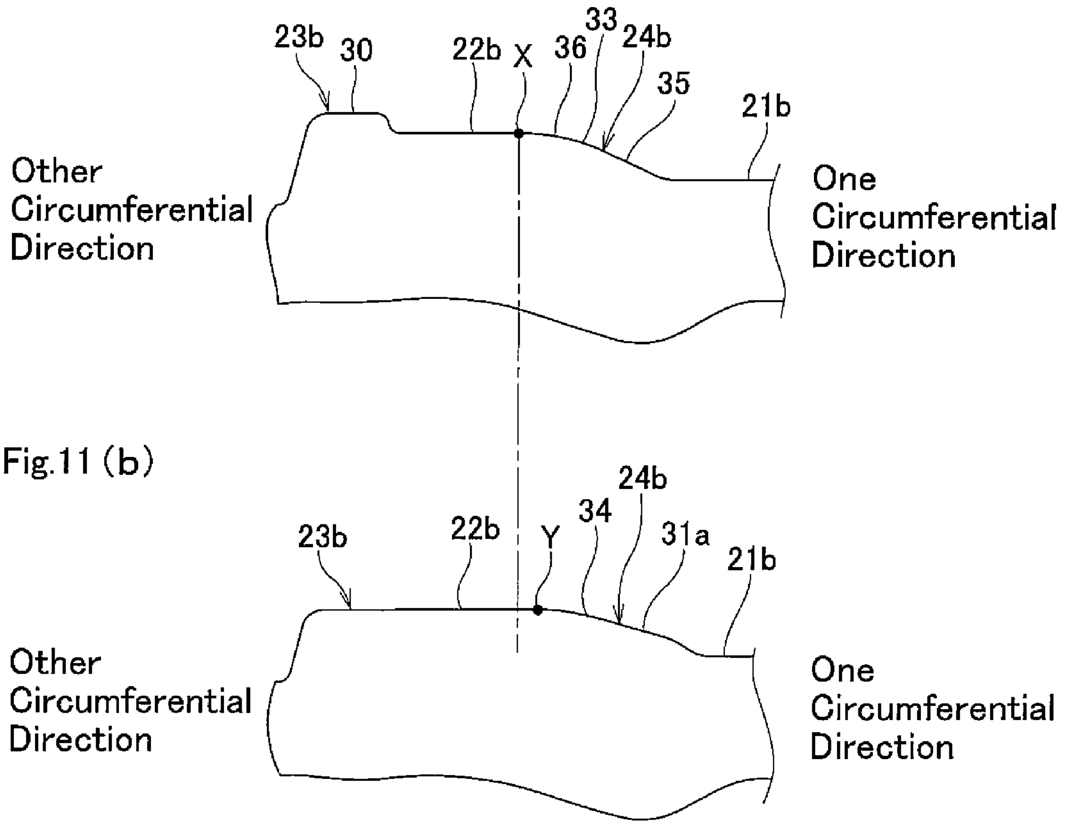
FIG. 11A is a schematic drawing corresponding to section B-B in FIG. 9.
FIG. 11B is a schematic drawing corresponding to section C-C in FIG. 9.

The second inclined surface 36 smoothly makes the other end in the circumferential direction continuous with the one end in the circumferential direction of the driven-side convex section 22*b*. Moreover, as illustrated in FIG. 9 and FIGS. 11A, 11B, the phase in the circumferential direction of the position X where the second inclined surface 36 is continuous with the driven-side convex section 22*b* is shifted further to the other side in the circumferential direction than the phase in the circumferential direction of position Y where the inside continuous surface 33 is continuous with the driven-side convex section 22*b*. However, the phase in the circumferential direction of position X and position Y can be the same.

Furthermore, the amount of protrusion (height) of the outside continuous surfaces 34 toward the outside in the width direction from the driven-side concave surfaces 21*b* at a position aligned in the circumferential direction with (at the same phase position in the circumferential direction as) the inside continuous surfaces 33 is less than the amount of protrusion (height) of the inside continuous surfaces 33 toward the outside in the width direction from the driven-side concave surfaces 21*b*. As long as the construction of the outside continuous surfaces 34 is constructed such that the other end in the circumferential direction is smoothly continuous with the one end in the circumferential direction of the driven-side convex section 22*b*, the construction of the other portions can be appropriately set within a range that satisfies the relationship with the inside continuous surface 33 as described above. For example, construction is possible in which the first inclined surface 35 is omitted, and the driven-side concave sections 21*b* extend to this position. With this kind of construction, the driven cam 17*b* can be made even more lightweight. The other construction of the driven cam 17*b* is the same as the construction of the driven cam 17*a* of the steering wheel position adjustment apparatus of the first example of the embodiment.

With the steering wheel position adjustment apparatus of this example, it is possible to reduce the operation torque that is applied to the adjustment lever 14 over the entire range of operation of the adjustment lever 14 for maintaining the position of the steering wheel after adjustment. In other words, from the middle to the last half of operation of the adjustment lever 14, the portions where the drive-side cam surface 20*a* can come in sliding contact with the driven-side continuous surfaces 24*b* (virtual sliding-contact section lines M) displace from state of sliding contact with only the inside continuous surfaces 33 of the driven-side continuous surfaces 24*b*, up the inside continuous surfaces 33, to a state of contact with the driven-side convex surfaces 22*b* of the driven-side cam surfaces 23*b* (state in which the adjusted position of the steering wheel can be maintained). Therefore, during operation, the portions (friction portions) of contact between the drive-side cam surface 20*a* and the driven-side cam surface 23*b* is limited to only the inside continuous surfaces 33, and it is possible to reduce the distance (radius of rotation) of the friction portions from the center of rotation of the drive cam 33. As a result, the moment that is represented by the product of the friction resistance and the radius of rotation of the friction portions can be reduced, and during the operation above, the operation torque that is applied to the adjustment lever 14 can be reduced.

In this example, the outside continuous surfaces 34 of the driven-side continuous surfaces 24*b* of the driven-side cam surface 23*b* is smoothly continuous with the driven-side convex sections 22*b*, and the phase in the circumferential direction of the continuous position X is shifted to the other side in the circumferential direction from the phase in the circumferential direction of the continuous position Y where the inside continuous surfaces 33 are continuous with the driven-side convex surfaces 22*b*. Therefore, when the drive-side convex surfaces 19*a* ride up on the driven-side convex surfaces 22*b* due to operation of the adjustment lever 14, the portions of the drive-side convex surfaces 19*a* that face the inside continuous surfaces 33 ride up on the driven-side convex surfaces 22*b* before the portions of the drive-side convex surfaces 19*a* that face the outside continuous surfaces 34 (the driven-side convex surfaces 22*b* and the drive-side convex surfaces 19*a* are on the same plane). As a result, the drive-side convex surfaces 19*a* smoothly ride up the driven-side convex surfaces 22*b* without getting caught on the continuous sections between the outside continuous surfaces 34 and the driven-side convex surfaces 22*b*, and the operator of the adjustment lever 14 is not made to feel that something is wrong. The construction of the other parts is the same as in the first example of the embodiment.

Third Example

Figure 12:
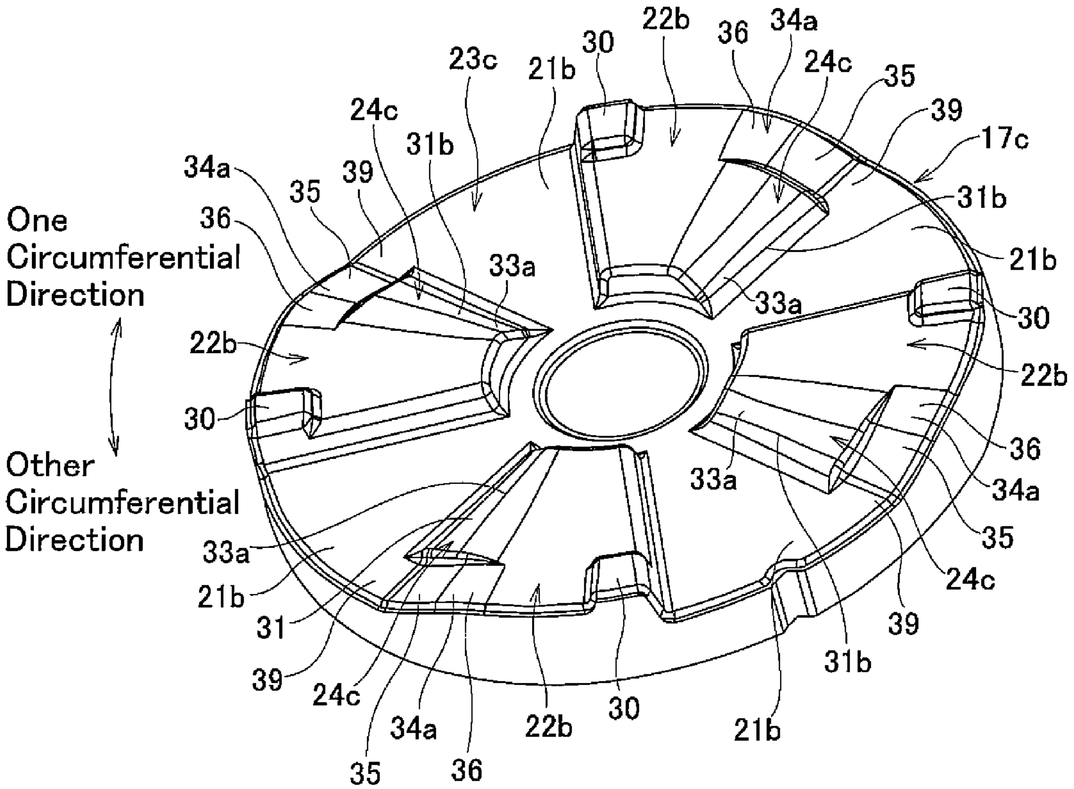
FIG. 12 is a drawing similar to FIG. 1 of a third example of an embodiment of the present invention.

FIG. 12 illustrates a third example of an embodiment of the present invention. In this example as well, the driven-side continuous surfaces 24*c* of the driven-side cam surface 23*c* of the driven cam 17*c* are constructed by inside continuous surfaces 33*a* that are provided on the inside in the radial direction, and outside continuous surfaces 34*a* that are provided on the outside in the radial direction. However, in this example, one end in the circumferential direction of the inside continuous surface 33*a* of the driven-side continuous surface 24*c* is not inclined with respect to the radial direction. On the other hand, the outside continuous surface 34 is such that the portion near the one end in the circumferential direction is a flat surface 39 that is on the same plane as the driven-side concave surface 21*b*, the middle section in the circumferential direction is a first inclined surface 35 and the portion near the other end in the circumferential direction is a second inclined surface 36.

Therefore, when the driven cam 17*c* is combined with the drive cam 16*a* (see FIG. 5) of an embodiments of the present invention, or in other words, the virtual sliding-contact section lines M, that indicate the portions of the drive-side cam surface (second cam surface) 20*a* that can come in sliding contact with the driven-side continuous surfaces (first continuous surfaces) 24*c* of the driven-side cam surface (first cam surface) 23*c* when moving from a state in which the position of the steering wheel can be adjusted to a state in which the position of the steering wheel can be maintained, are not inclined in the circumferential direction with respect to one end in the circumferential direction of the inside continuous surfaces 33*a* at the time when the virtual sliding-contact section lines M overlap the one end in the circumferential direction of the inside continuous surfaces 33*a* of the driven-side continuous surfaces 24*c* and substantially overlap the entire one end in the circumferential direction of the inside continuous surfaces 33*a*. However, in this example as well, when the adjustment lever 14 is operated in order to maintain the position of the steering wheel after adjustment, the portions (friction portions) where the drive-side cam surface 20*a*, which is the second cam surface, comes in contact with the driven-side cam surface 23*c*, which is the first cam surface, can be limited to only the inside continuous surfaces 33*a*. As a result, the distance (radius of rotation) of the friction portion from the center of rotation of the drive cam 16*a* can be reduced, and the moment that is expressed as the product of the friction resistance and the radius of rotation can be kept small.

Figure 1:
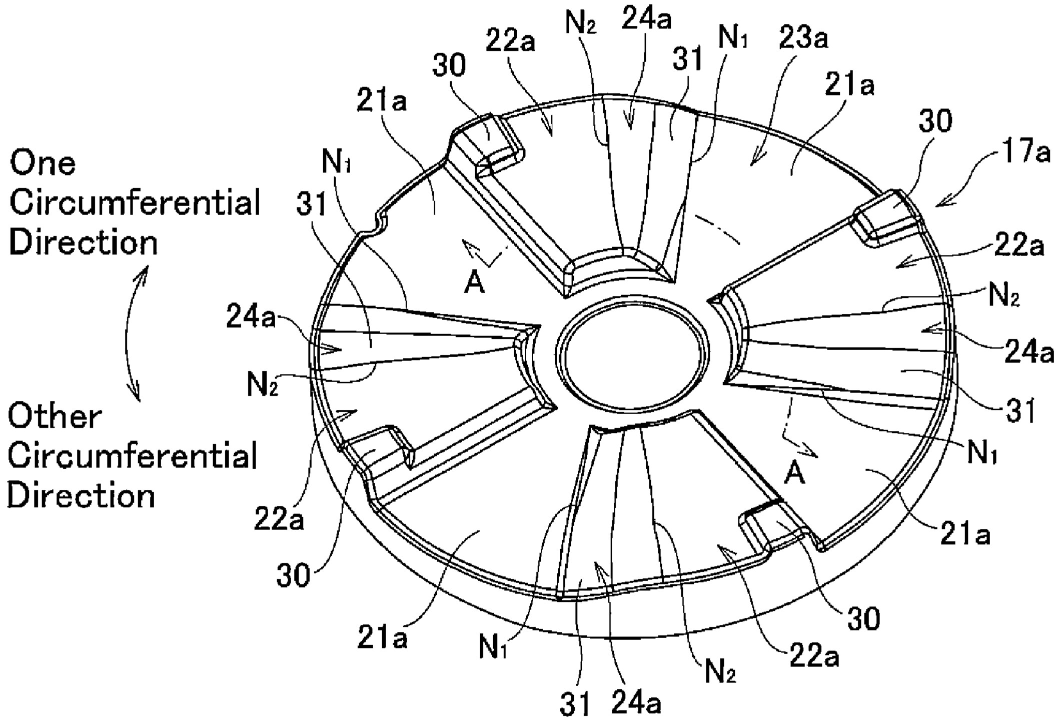
FIG. 1 is a perspective drawing of a driven cam of a cam apparatus that is used in a steering wheel position adjustment apparatus of a first example of an embodiment of the present invention, and is a view of the assembled state as seen from the outside in the width direction.
Figure 2:
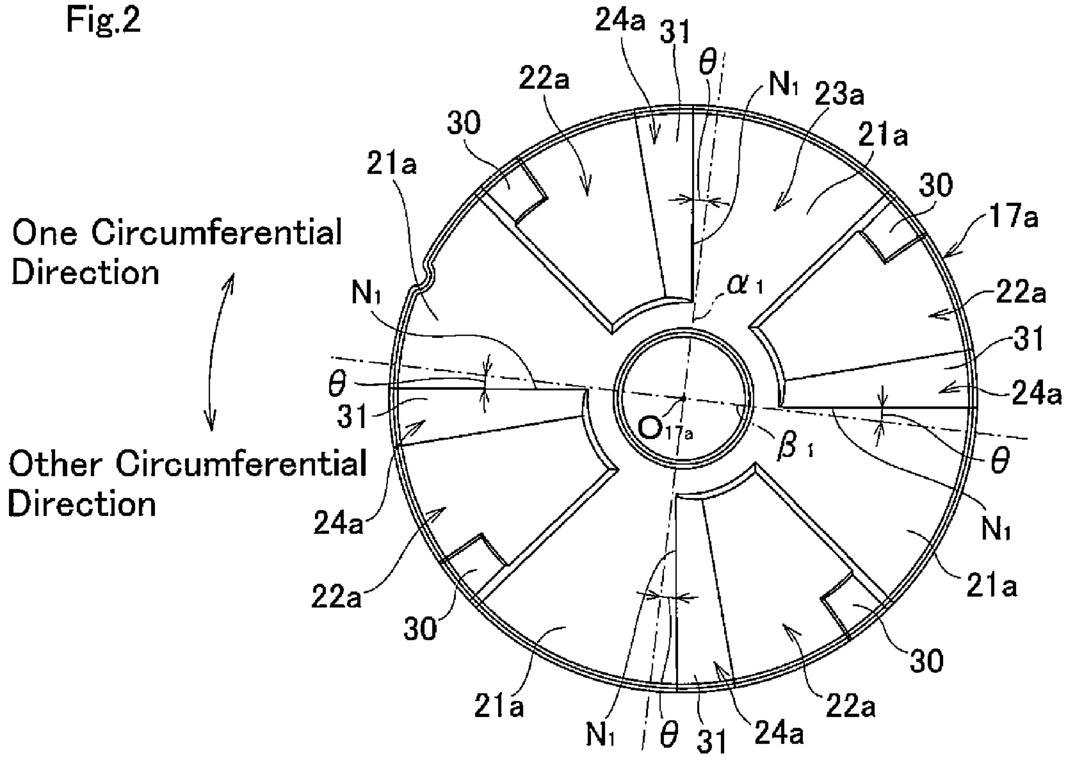
FIG. 2 is an orthographical drawing of the driven cam illustrated in FIG. 1, and is a view of the assembled state as seen from the outside in the width direction.
Figure 3:
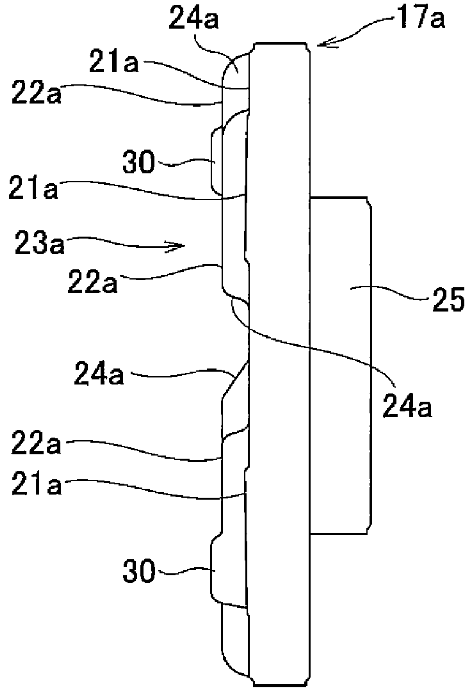
FIG. 3 is an orthographical drawing of the driven cam illustrated in FIG. 1, and is a view of the assembled state as seen in the radial direction.
Figure 4:
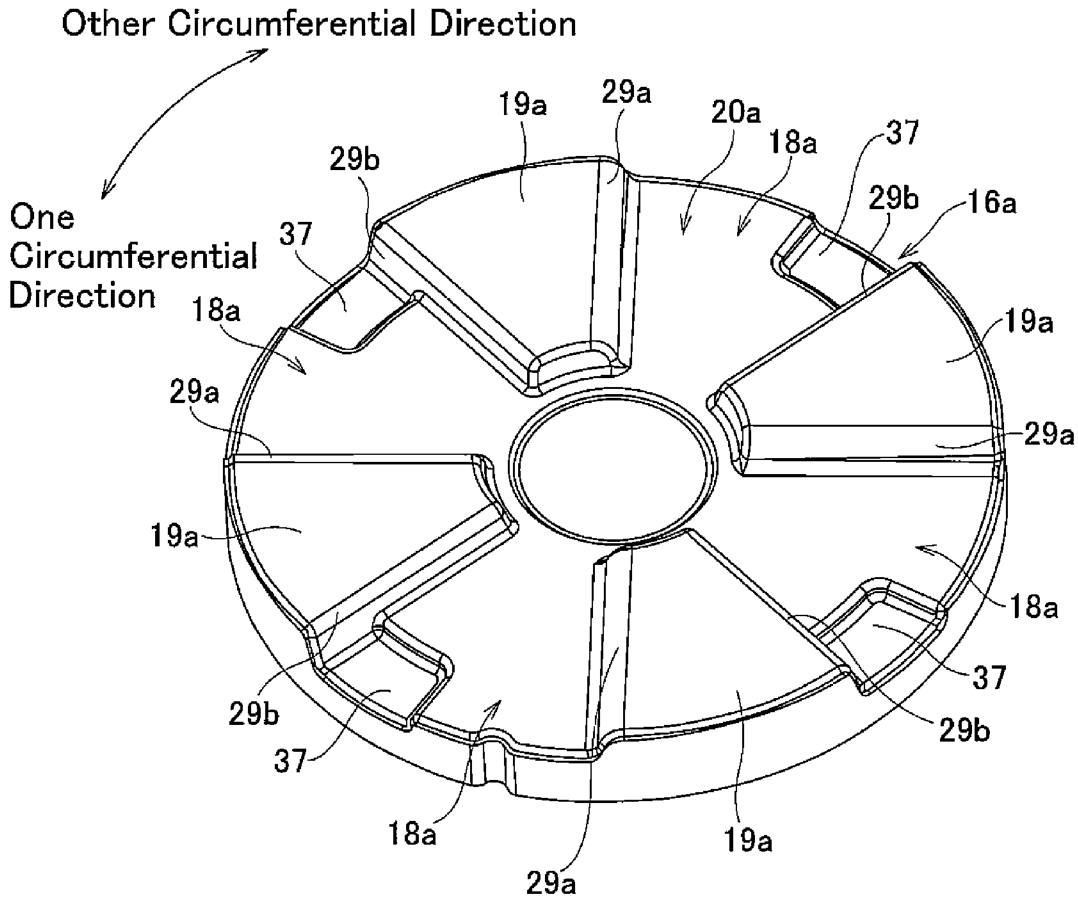
FIG. 4 is a perspective drawing of a drive cam of a cam apparatus that is used in a steering wheel position adjustment apparatus of the first example of an embodiment of the present invention, and is a view of the assembled state as seen from the outside in the width direction.
Figure 5:
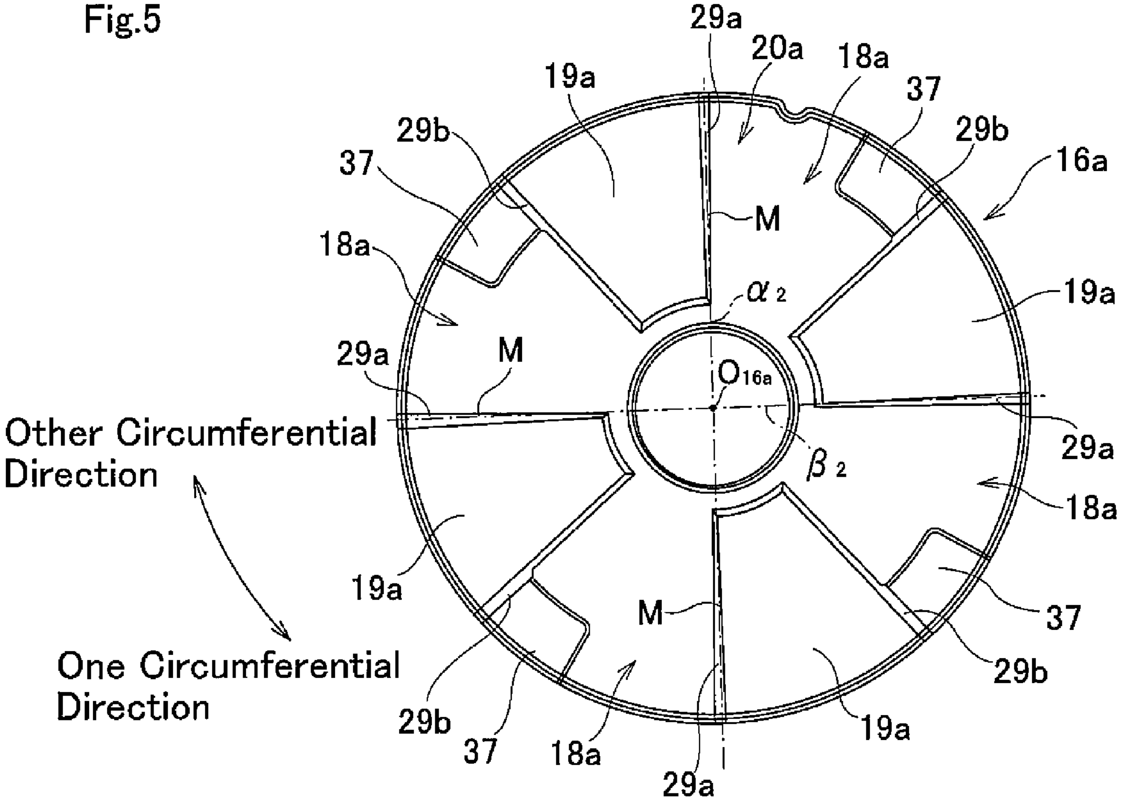
FIG. 5 is an orthographical drawing of the drive cam illustrated in FIG. 4, and is a view of the assembled state as seen from the outside in the width direction.
Figure 6:
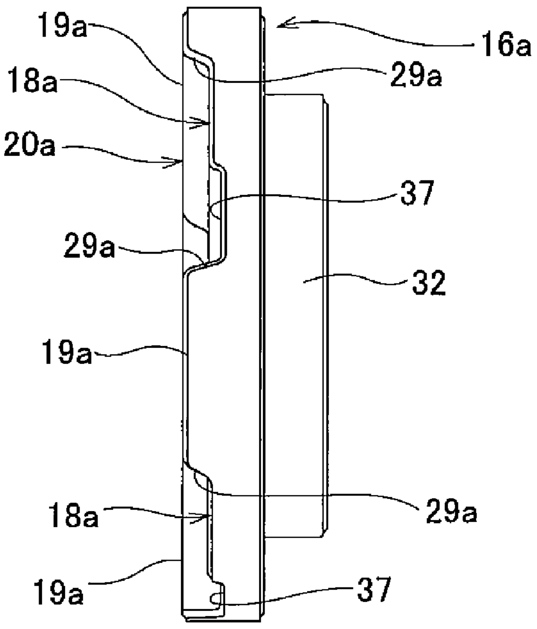
FIG. 6 is an orthographical drawing of the drive cam illustrated in FIG. 4, and is a view of the assembled state as seen in the radial direction.

However, in this example as well, the drive-side continuous surfaces 29*a* of the drive cam 16*a* illustrated in FIG. 5 can be formed so as to incline an angle θ to one side in the circumferential direction in FIG. 5, or in other words, to one side in the circumferential direction with respect to the radial direction (virtual lines $\alpha_1$, $\beta_1$ that extend in the radial direction and pass through the center axis $O_{16a}$ of the drive cam 16*a*). In this case, the virtual sliding-contact section lines M, that indicate the portions of the drive cam 16*a*, which is the second cam surface, that can come in sliding contact with the driven-side continuous surfaces 24*c*, which are first continuous surfaces, when moving from a state in which adjustment of the steering wheel is possible, to a state in which the position of the steering wheel can be maintained, overlap one end in the circumferential direction of the driven-side continuous surfaces 24*c*, are inclined to one side in the circumferential direction with respect to one end in the circumferential direction of the driven-side continuous surfaces 24*c*, so it is possible to obtain the same effect as in the first and second examples of the embodiment of the present invention. The construction, functions and effects of the other parts are the same as in the second example of the embodiment.

The steering wheel position adjustment apparatus of the present invention can also be applied to a telescopic steering apparatus having a telescopic function. In that case, the steering column is constructed by combining an inner column and an outer column that can expand and contract, and a displacement bracket is located on and fastened to the rear side column of the inner column and outer column, which displaces in the forward-backward direction as the forward-backward position of the steering wheel is adjusted. Holes that are formed in the displacement bracket are constructed by long holes in the axial direction.

Furthermore, the relationship with the driven-side continuous surfaces (first continuous surfaces) of the driven-side cam surface (first cam surface) and the virtual sliding-contact section lines M that indicate the portions of the drive-side cam surface (second cam surface) that can come in contact with the driven-side continuous surfaces is not limited to the construction in the examples of the embodiment illustrated in the figures. In other words, various constructions can be employed as long as the virtual sliding-contact section lines M are inclined to one side in the circumferential direction with respect to one end in the circumferential direction of the driven-side continuous surfaces at the time when the virtual sliding-contact section lines M overlap the one end in the circumferential direction of the driven-side continuous surfaces, and the relationship is satisfied in which the portions of sliding contact between the drive-side cam and the driven-side continuous surfaces gradually increase from the inside in the radial direction to the outside in the radial direction when moving from a state in which the position of the steering wheel can be adjusted to a state in which the position can be maintained, and these kinds of constructions are also included in the present invention.

Moreover, the construction of the cam surface of the cam apparatus of the present invention can be applied to the drive-side cam surface of the drive cam instead of the driven-side cam surface of the driven cam. When the present invention is applied to the drive-side cam, the positional relationship in the circumferential direction is such that direction the drive cam is rotated is in one circumferential direction, and the opposite direction is the other circumferential direction.

In the steering wheel position adjustment apparatus of the present invention, the positions of the cam apparatus 15 and adjustment lever 14 are not limited to the same positions as in the conventional construction illustrated in FIG. 14, and can be provided on the outside in the width direction of the other support-plate section 7 (right support-plate section 7 in FIG. 13) of the vehicle-side bracket. When employing this kind of construction, the pressure member is constructed by a head section 38 that is provided on the other end section of the rod member 12 (see FIG. 14)

INDUSTRIAL APPLICABILITY

The steering wheel position adjustment apparatus of the present invention can be applied not only to a tilt steering apparatus that is capable of adjusting only the height position of the steering wheel, but can also be applied to a telescopic steering apparatus that is capable of adjusting only the forward-backward position, or can also be applied to a tilt and telescopic steering apparatus that is capable of adjusting both the height position and the forward-backward position.

EXPLANATION OF REFERENCE NUMBERS

1 Steering shaft
2 Steering column
3 Front vehicle-side bracket
4 Tilt shaft
5 Rear vehicle-side bracket
6 Installation-plate section
7 Support-plate section
8 Long tilt hole
9 Displacement bracket
10 Supported section
11 Through hole
12 Rod member
13 Pressure member
14 Adjustment lever
15 Cam apparatus
16, 16*a* Drive cam
17, 17*a*, 17*b*, 17*c* Driven cam
18, 18*a* Drive-side concave surface
19, 19*a* Drive-side convex surface
20, 20*a*, 20*b* Drive-side cam surface
21, 21*a*, 21*b* Driven-side concave surface
22, 22*a*, 22*b* Driven-side convex surface
23, 23*a*, 23*b*, 23*c* Driven-side cam surface
24, 24*a*, 24*b*, 24*c* Driven-side continuous surface
25 Convex engaging section
26*a*, 26*b* Inclined surface
27 Flat surface
28 Stepped section
29, 29*a*, 29*b* Drive-side continuous surface
30 Convex rotation stopper
31, 31*a* Inclined surface
32 Convex engaging section
33, 33*a* Inside continuous surface
34, 34*a* Outside continuous surface
35 First inclined surface
36 Second inclined surface
37 Concave section
38 Head section
39 Flat surface

What is claimed is:

1. A steering wheel position adjustment apparatus, comprising:

a steering shaft having a rear-end section to which a steering wheel is fastened;

a steering column supporting the steering shaft on an inside of the steering column so as to be able to rotate freely, the steering column having a column-side bracket that is fastened to a middle section in an axial direction of the steering column, and a column-side through hole being formed in part of the column-side bracket so as to pass in a width direction through the column-side bracket;

a vehicle-side bracket having an installation-plate section that is supported by and fastened to a vehicle body or a member that is fastened to the vehicle body, a pair of support-plate sections hanging down from the installation-plate section and being located on both sides in the width direction of the column-side bracket, and vehicle-side through holes being formed in portions of the pair of support-plate sections that are aligned with each other and are aligned with the column-side through hole;

a rod member inserted in the width direction through the vehicle-side through holes and the column-side through hole;

a drive cam fitting around one end section of the rod member in a state such that displacement in a direction going away from one of the pair of support-plate sections is prevented, the drive cam having a drive-side cam surface on an inside surface in the width direction of the drive cam;

a driven cam fitting around a portion near the one end of a middle section of the rod member that protrudes out from an outside surface in the width direction of the one support-plate section so as to be able to displace in the width direction relative to the rod member, the drive cam having a driven-side cam surface on an outside surface in the width direction of the drive cam that engages with the drive-side cam surface;

a pressure member provided on a portion of other end section of the rod member that protrudes out from an outside surface of other of the pair of support-plate sections; and an adjustment lever having a base-end section that is joined to the drive cam, and one cam surface of the driven-side cam surface and the drive-side cam surface comprising: plural first concave surfaces; plural first convex surfaces that are provided in portions in a circumferential direction between the first concave surfaces and that protrude further toward a side of other cam surface of the driven-side cam surface and the drive-side cam surface than the first concave surfaces; and plural first continuous surfaces that make the first concave surfaces continuous with the first convex surfaces;

the other cam surface comprising: plural second concave surfaces; and plural convex surfaces that are provided in portions in the circumferential direction between the second concave surfaces and that protrude further toward a side of the one cam surface than the second concave surfaces; and virtual sliding-contact section lines that indicate portions on the other cam surface that can come in sliding contact with the first continuous surfaces when moving from a state in which a position of the steering wheel can be adjusted to a state in which the position of the steering wheel can be maintained, the virtual sliding-contact section lines being inclined toward one side in the circumferential direction with respect to one end in the circumferential direction of the first continuous surfaces at the time when the virtual sliding-contact section lines overlap the one end in the circumferential direction of the first continuous surfaces.

2. The steering wheel position adjustment apparatus according to claim 1 wherein the first continuous surfaces comprise plural inclined surfaces, and an angle of inclination of the inclined surfaces with respect to a virtual plane in a direction that is orthogonal to a center axis of the driven cam or the drive cam on which the inclined surfaces are formed becomes smaller going toward the first convex surfaces.

3. The steering wheel position adjustment apparatus according to claim 1, wherein the first continuous surfaces comprise inside continuous surfaces that are provided on an inside in a radial direction, and outside continuous surfaces that are provided on an outside in the radial direction;

the inside continuous surfaces are constructed by inclined surfaces that make an edge on other end in the circumferential direction of the first concave surfaces continuous with an edge of one end in the circumferential direction of the first convex surfaces, and when moving from the state in which the position of the steering wheel can be adjusted to the state in which the position of the steering wheel can be maintained, the inside continuous surfaces are able to come in sliding contact with the other cam surface;

the outside continuous surfaces have portions near the first convex surfaces that are smoothly continuous with edges on the one end in the circumferential direction of the first convex surfaces, with an amount of protrusion of the outside continuous surfaces toward the side of the other cam surface from the first concave surfaces less than an amount of protrusion of the inside continuous surfaces toward the side of the other cam surface from the first concave surfaces at the same phase positions in the circumferential direction as the inside continuous surfaces, and when moving from the state in which the position of the steering wheel can be adjusted to the state in which the position of the steering wheel can be maintained, the outside continuous surfaces do not come in sliding contact with the other cam surface.

4. The steering wheel position adjustment apparatus according to claim 3, wherein the phase in the circumferential direction of positions where the inclined surfaces of the outside continuous surfaces are continuous with the first convex surfaces and the phase in the circumferential direction of positions where the inside continuous surfaces are continuous with the first convex surfaces are the same, or shifted toward the other side in the circumferential direction.

5. The steering wheel position adjustment apparatus according to claim 1, wherein convex rotation stoppers are provided on the first convex surfaces, and prevent the drive cam from rotating further toward the other side in the circumferential direction with respect to the driven cam by engaging with part of the other cam surface.

* * * * *